(12) United States Patent
Kubota

(10) Patent No.: US 8,531,774 B2
(45) Date of Patent: Sep. 10, 2013

(54) EYEPIECE OPTICAL SYSTEM HAVING A REFLECTIVE SURFACE AND ELECTRONIC VIEW FINDER INCORPORATING THE SAME

(75) Inventor: Yuki Kubota, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 82 days.

(21) Appl. No.: 13/269,147

(22) Filed: Oct. 7, 2011

(65) Prior Publication Data

US 2012/0099206 A1    Apr. 26, 2012

(30) Foreign Application Priority Data

Oct. 26, 2010    (JP) .................................. 2010-239374

(51) Int. Cl.
*G02B 25/00*    (2006.01)
(52) U.S. Cl.
USPC ............................. 359/645; 359/644; 359/643
(58) Field of Classification Search
USPC ........................... 359/644–646, 543, 546, 785
See application file for complete search history.

(56) References Cited

U.S. PATENT DOCUMENTS

| | | | |
|---|---|---|---|
| 6,487,374 B1 * | 11/2002 | Ishihara | ........................ 396/385 |
| 7,180,675 B2 | 2/2007 | Tamura et al. | |
| 2005/0052756 A1 | 3/2005 | Tamura et al. | |
| 2009/0290225 A1 | 11/2009 | Asakura et al. | |
| 2010/0104272 A1 * | 4/2010 | Ogino et al. | ................... 396/374 |

FOREIGN PATENT DOCUMENTS

| | | |
|---|---|---|
| JP | 2005-084284 | 3/2005 |
| JP | 2009-282181 | 12/2009 |

* cited by examiner

*Primary Examiner* — Darryl J Collins
*Assistant Examiner* — William Alexander
(74) *Attorney, Agent, or Firm* — Kenyon & Kenyon LLP

(57) ABSTRACT

The eyepiece optical system of the invention is characterized by comprising, in order from the display plane side on which images being viewed are formed toward the exit side, a first lens component of positive refracting power, a reflecting member having only one reflective surface, a second lens component of negative refracting power and a third lens component of positive refracting power. The lens component here means a lens block that, in an optical path involved, contacts air at only two surfaces: the display-plane-side refractive surface and the exit-side refractive surface.

23 Claims, 17 Drawing Sheets

Example 1

(a) −1 diopter (b) +1 diopter (c) −3 diopter

Example 2

(a) −1diopter (b) +1diopter (c) −3diopter

Example 3

Example 4

(a) −1diopter (b) +1diopter (c) −3diopter

Example 5

(a) −1diopter (b) +1diopter (c) −3diopter

Example 6

(a) −1diopter (b) +1diopter (c) −3diopter

Example 7

(a) −1diopter (b) +1diopter (c) −3diopter

EYEPIECE OPTICAL SYSTEM HAVING A REFLECTIVE SURFACE AND ELECTRONIC VIEW FINDER INCORPORATING THE SAME

This application claims benefit of Japanese Application No. 2010-239374 filed in Japan on Oct. 26, 2010 the contents of which are incorporated by this reference.

The present invention relates generally to an eyepiece optical system designed to enlarge an object in such a way as to view it with the naked eye, and more particularly to such an eyepiece optical system having a reflective surface. More particularly, the invention relates to an electronic view finder that is primarily integrated with or attached onto the outer casing of a camera to view images being taken.

BACKGROUND ART OF THE INVENTION

So far, there has been the so-called real image type view finder known for camera's finders, in which a real image is formed through an objective optical system so that the real image is viewed through an eyepiece optical system. The real image type view finder known so far in the art, for instance, includes a finder wherein an image formed on a screen mat through a taking optical system in the form of an objective optical system is viewed through a penta roof prism and an eyepiece optical system, and a finder that is optically independent from a taking optical system.

The former finder, because of the need for space for receiving the penta roof prism, works against size reduction of the taking apparatus. The latter gives rise to parallaxes between the image being taken and the image being view upon close-range shooting, because the optical axis of the taking optical system is separate away from the optical axis of a finder's objective lens. This is also unsuitable for checking an in-focus state using the taking optical system.

With recent improvements in the performance of electronic display devices, an electronic view finder designed to use an eyepiece optical system to view an image displayed on the display surface of an electronic display device is going mainstream in the digital camera or video camera field.

A typical electronic view finder receives signals from an image formed on an imaging device through a taking optical system to display the subject's image to be viewed. Thus, there is no parallax between the image being taken and the image being viewed, and the ability to have a grasp of whether the image being taking is in focus or not is achievable. In addition, the distance from the display surface of the electronic image device to an exit pupil can be curtailed, offering a sensible tradeoff between making sure the field of view of the image being viewed and size reduction.

Referring to the thickness of the display device used on the electronic view finder, on the other hand, it has some influences on the optical axis size of the finder when the optical axis of the display device extends straight. JP(A)'s 2009-282181 and 2005-84284 disclose an electronic view finder wherein a reflective surface is inserted in an optical path through it to make the finder short in its lengthwise direction.

SUMMARY OF THE INVENTION

The present invention provides an electronic view finder in any one of the following embodiments.

The eyepiece optical system comprises in order from a display plane side, on which an image being viewed is formed, toward an exit side:
a first lens component of positive refracting power,
a reflecting member having only one reflective surface,
a second lens component of negative refracting power, and
a third lens component of positive refracting power, wherein each or the lens component means a lens block that, in an optical path involved, contacts air at only two surfaces: a display-plane-side refractive surface and an exit-side refractive surface.

The requirements for, and the advantages of, the aforesaid arrangement of the inventive eyepiece optical system will now be explained.

In the inventive eyepiece optical system, only one reflective surface is provided in the optical path so that the optical system can be curtailed in the direction of light exiting out from the optical system, working for a curtailing of the full length. Use of only one reflective surface also works for making sure the angle of field.

Further, the converging action of the first lens component having positive refracting power helps minimize the diameter of a light beam through the reflecting member or the second lens component, working for diameter reduction. The second lens component of negative refracting power has a diverging action that facilitates making sure the diameter of a light beam through the third lens component, working for making sure the angle of field. And the converging action of the third lens component having positive refracting power enables a light beam to be guided into the viewer's eyeball in a larger angle-of-field state. The positive-negative-positive profile arrangement also works for correction of aberrations.

Furthermore, while the fact that the optical path gets longer before and after the reflecting member is taken into account, the reflecting member is located between the first positive lens component and the negative lens component. This facilitates minimization of an increase in the diametrical size of the eyepiece optical system, shadings, etc., working more in favor of the overall balance inclusive of aberration performance.

For the inventive eyepiece optical system, it is more preferable to satisfy one of the following requirements or limitations or, alternatively, two or more of them at the same time.

In the inventive eyepiece optical system, the first lens component, the second lens component, and the third lens component is a single lens.

Constructing each of the first, the second and the third lens component of a single lens works more in favor of size reduction and cost reduction.

For the inventive eyepiece optical system, it is preferable to satisfy the following Condition (1):

$$0.3 < D12/DT < 0.9 \quad (1)$$

where D12 is the distance along the optical axis from the exit-side refractive surface of the first lens component to the display-surface-side refractive surface of the second lens component, and DT is the distance along the optical axis from the display plane to the exit-side refractive surface of the third lens component, provided that an optical element or elements other than the first lens component, the second lens component and the third lens component are supposed to have a length as calculated on an air basis, and when there is a variable diopter, that distance is supposed to have a value at −1 diopter.

Condition (1) defines the preferable distance from the first lens component to the second lens component. The lower limit value of Condition (1) should preferably be set at not less than 0.3, because it is possible to take hold of the space for receiving the reflective surface while the full length of the optical system is kept short. As the upper limit value is set at not greater than 0.9 so as to keep the distance between the first and the second lens component against getting long, it works for making sure the angle of field. It is here to be noted that when the eyepiece optical system is adjustable in terms of diopter, that distance is supposed to have a value at −1 diopter, as also applied hereinafter in the following embodiments of the eyepiece optical system.

Further, the inventive eyepiece optical system should satisfy the following Condition (2):

$$0.5 < f1/f < 0.35 \quad (2)$$

where f1 is the focal length of the first lens component, and f is the focal length of the whole eyepiece optical system, provided that when there is a variable diopter, each or the focal length is supposed to have a value at −1 diopter.

As the lower limit value of Condition (2) is set at not less than 0.5 so as to prevent the power of the first lens component from being in excess, it helps reduce both aberrations: field curvature and distortion. As the upper limit value of Condition (2) is set at not greater than 3.5 so as to make sure the power of the first lens component, it enables the diameter of a light beam through the second lens component to be diminished, working for size reduction. It also makes it easy to take hold of the function of correcting aberrations that remain at the second and the third lens component (primarily off-axis aberrations).

For the inventive eyepiece optical system, it is preferable for the second lens component to be movable for diopter adjustment and satisfy the following Condition (3)

$$-3.0 < f2/f < -0.3 \quad (3)$$

where f2 is the focal length of the second lens component, and f is the focal length of the whole eyepiece optical system, provided that when there is a variable diopter, each or the focal length is supposed to have a value at −1 diopter.

As the second lens component is designed to move for diopter adjustment, it helps prevention of entrance of dusts. It is then preferable to satisfy Condition (3). As the lower limit value is set at not less than −3.0 so as to make sure the power of the second lens component, it helps keep the amount of movement of the second lens component small during diopter adjustment, working for achieving compactness. As the upper limit value is set at not greater than −0.3 so as to keep the power of the second lens component moderate, it results in facile higher-order aberration reduction.

Further, the inventive eyepiece optical system satisfies the following Condition (4):

$$0.2 < f3/f < 0.99 \quad (4)$$

where f3 is the focal length of the third lens component, and f is the focal length of the whole eyepiece optical system, provided that when there is a variable diopter, each or the focal length is supposed to have a value at −1 diopter.

As the lower limit value of Condition (4) is set at not less than 0.2 so as to keep the power of the third lens component moderate, it helps locate the exit pupil at a far away position, working for size reduction. As the upper limit value of Condition (4) is set at not greater than 0.99 so as to make sure the power of the third lens component, it works for making sure the angle of field.

Further, the inventive eyepiece optical system satisfies the following Condition (5):

$$0.65 < SF1 < 5.0 \quad (5)$$

where SF1 is the shape factor of the first lens component, as represented by $$SF1 = (r11 + r12)/(r11 - r12)$$

where r11 is the paraxial radius of curvature of the display-plane-side refractive surface of the first lens component, and r12 is the paraxial radius of curvature of the exit-side refractive surface of the first lens component.

As the lower limit value of Condition (5) is set at not less than 0.65 so as to keep the refracting power of the display-plane-side surface from getting positively strong, it helps make sure the height of incident light rays at the second lens component, working for making sure the angle of field and an eye point. As the upper limit value is set at not greater than 5.0 so as to keep the display-plane-side surface from having a negatively strong refracting power, it works for a curtailing of the full length of the optical system.

Further, the inventive eyepiece optical system satisfies the following Condition (6):

$$-4.5 < SF2 < -0.05 \quad (6)$$

where SF2 is the shape factor of the second lens component as represented by $$SF2 = (r21 + r22)/(r21 - r22)$$

where r21 is the paraxial radius of curvature of the display-plane-side refractive surface of the second lens component, and r22 is the paraxial radius of curvature of the exit-side refractive surface of the second lens component.

As the lower limit value of Condition (6) is set at not less than −4.5 so as to permit off-axis light rays incident on the third lens component to gain height while minimizing off-axis aberrations at the display-plane-side surface, it leads to making sure the angle of field and the eye point. As the upper limit value of Condition (6) is set at not greater than −0.05, it helps minimize off-axis aberrations occurring at the exit-side surface, and works for diameter reduction of the optical system.

Further, the inventive eyepiece optical system satisfies the following Condition (7):

$$-0.5 < SF3 < 0.28 \quad (7)$$

where SF3 is the shape factor of the third lens component as represented by $$SF3 = (r31 + r32)/(r31 - r32)$$

where r31 is the paraxial radius of curvature of the display-plane-side refractive surface of the third lens component, and r32 is the paraxial radius of curvature of the exit-side refractive surface of the third lens component.

As the lower limit value of Condition (7) is set at not less than −0.5 so as to make sure the refracting power of the exit-side surface, it works for making sure the angle of field. As the upper limit value of Condition (7) is set at not greater than 0.28 so as to keep the refracting power of the exit-side surface moderate, it leads to making sure the eye point.

In the inventive eyepiece optical system, both the second lens component and the third lens component have aspheric surfaces.

As aspheric surfaces are applied to both the second lens component and the third lens component, it works more for reductions of higher-order spherical aberrations, coma, etc.

Further in the inventive eyepiece optical system, the exit-side surface of the first lens component is of convex shape that is larger in the absolute value of refracting power than the display-plane-side surface.

As the exit-side surface of the first lens component is configured into a convex surface that is larger in the absolute value of refracting power than the display-plane-side surface, it works for offering a sensible tradeoff between making sure the positive refracting power necessary for the first lens component and correction of aberrations.

Further in the inventive eyepiece optical system, the display-plane-side surface of the second lens component is of concave shape that is larger in the absolute value of refracting power than the exit-side surface.

As the display-plane-side surface of the second lens component is configured into a concave surface that is larger in the absolute value of refracting power than the exit-side surface, it works for offering a sensible tradeoff between making sure the negative refracting power necessary for the second lens component and correction of aberrations.

In the inventive eyepiece optical system, the third lens component has a double-convex shape working for making sure the positive refracting power necessary for the third lens component and correction of aberrations.

More preferably, two or more of the aforesaid requirements or limitations should be satisfied at the same time.

The electronic view finder according to the invention comprises an image display device having an image display plane and any one of the eyepiece optical systems as recited above.

More preferably, the lower and upper limit values of the respective conditions should be narrowed down as described below, because the respective functions get more reliable.

Of Condition (1), the lower limit value should be set at more preferably 0.35, even more preferably 0.4, and the upper limit value should be set at more preferably 0.8, even more preferably 0.7.

Of Condition (2), the lower limit value should be set at more preferably 0.7, even more preferably 0.9, and the upper limit value should be set at more preferably 3.0, even more preferably 2.5.

Of Condition (3), the lower limit value should be set at more preferably −2.0, even more preferably −1.5, and the upper limit value should be set at more preferably −0.4, even more preferably −0.5.

Of Condition (4), the lower limit value should be set at more preferably 0.3, even more preferably 0.4, and the upper limit value should be set at more preferably 0.9, even more preferably 0.8.

Of Condition (5), the lower limit value should be set at more preferably 0.68, even more preferably 0.7, and the upper limit value should be set at more preferably 4.0, even more preferably 3.5.

Of Condition (6), the lower limit value should be set at more preferably −3.5, even more preferably −3.0, and the upper limit value should be set at more preferably −0.1, even more preferably −0.15.

Of Condition (7), the lower limit value should be set at more preferably −0.3, even more preferably −0.15, and the upper limit value should be set at more preferably 0.26, even more preferably 0.24.

DESCRIPTION OF EXEMPLARY EMBODIMENTS

The inventive eyepiece optical systems and electronic view finders will be explained with reference to FIGS. 1 to 16. More specifically, FIGS. 1 to 8 are sets of sectional views for illustrating the electronic view finders of Examples 1 to 8, respectively. In each figure, (a), (b) and (c) are indicative of a −1 dioper state, a +1 dioper state and a −3 diopters state, respectively. FIGS. 9 to 16 are sets of aberration diagrams for Examples 1 to 8, respectively.

Figure 1:
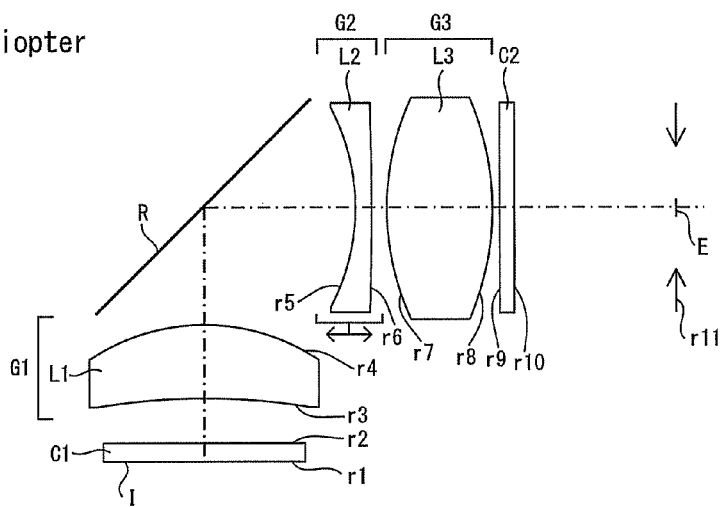
FIG. 1 is a set of sectional views of the eyepiece optical system according to Inventive Example 1 as taken apart along the optical axis.
Figure 1:
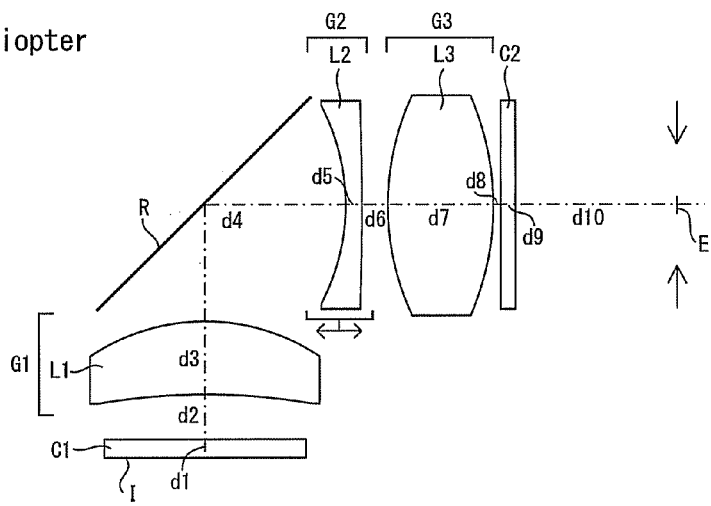
Figure 1:
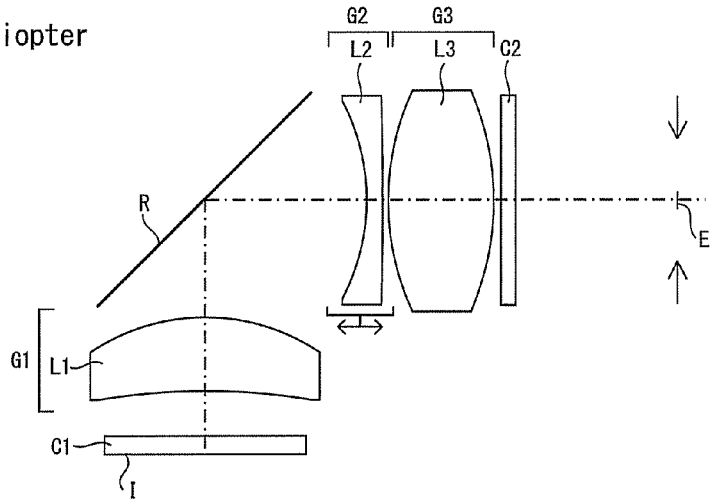
Figure 2:
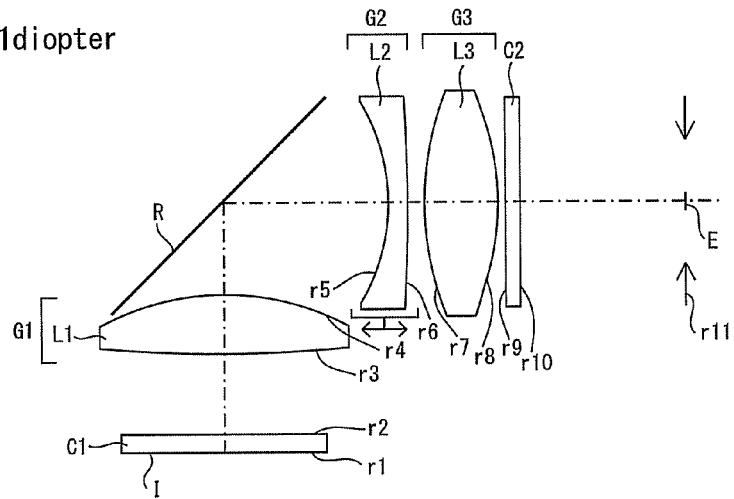
FIG. 2 is a set of sectional views of the eyepiece optical system according to Inventive Example 2 as taken apart along the optical axis.
Figure 2:
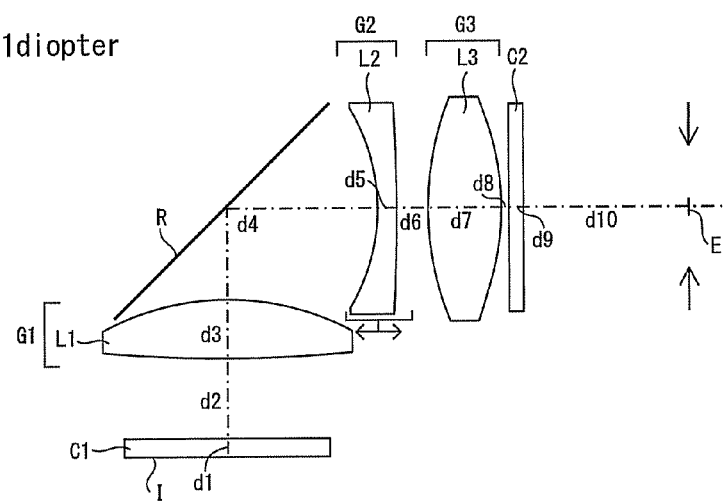
Figure 2:
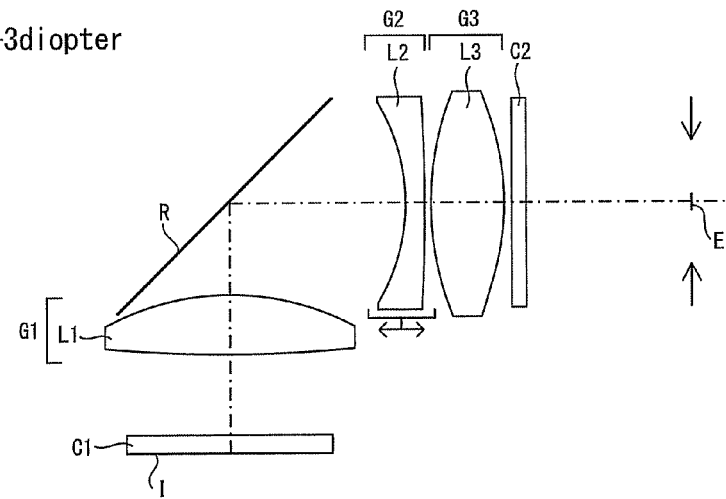
Figure 3:
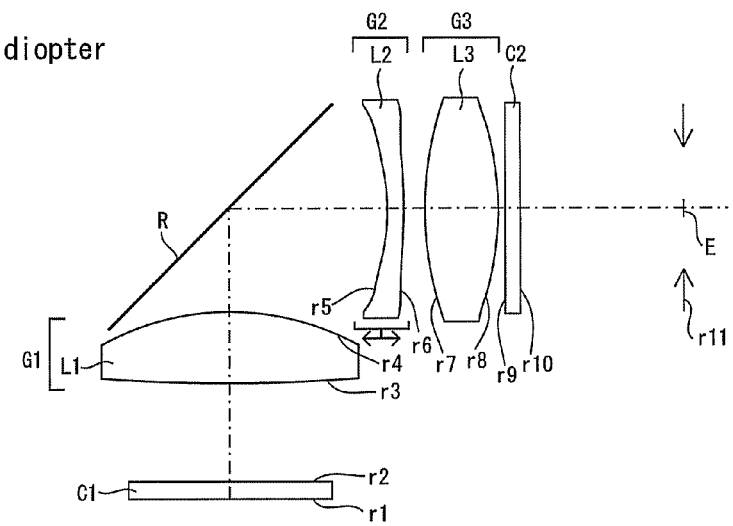
FIG. 3 is a set of sectional views of the eyepiece optical system according to Inventive Example 3 as taken apart along the optical axis.
Figure 3:
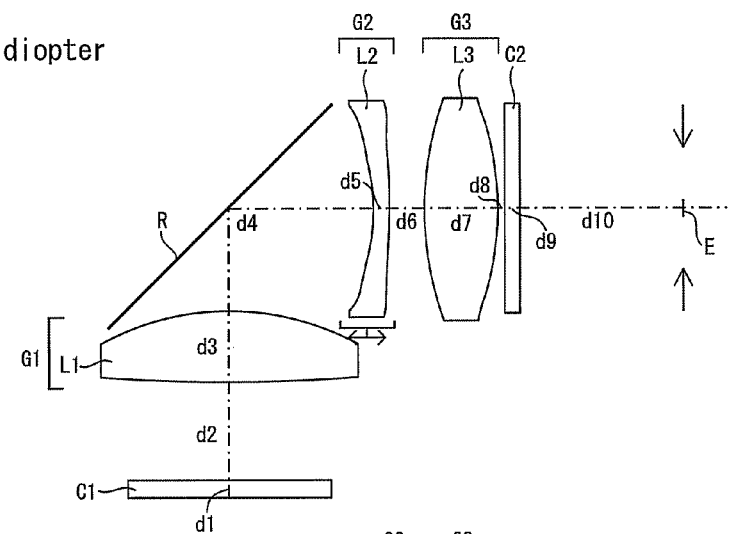
Figure 3:
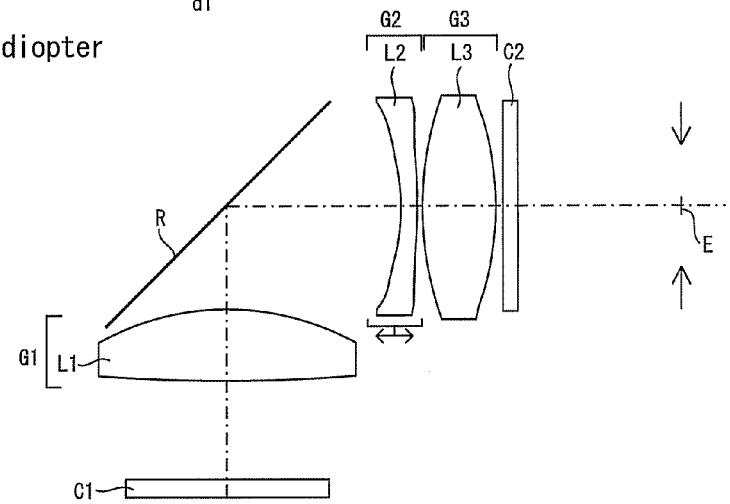
Figure 4:
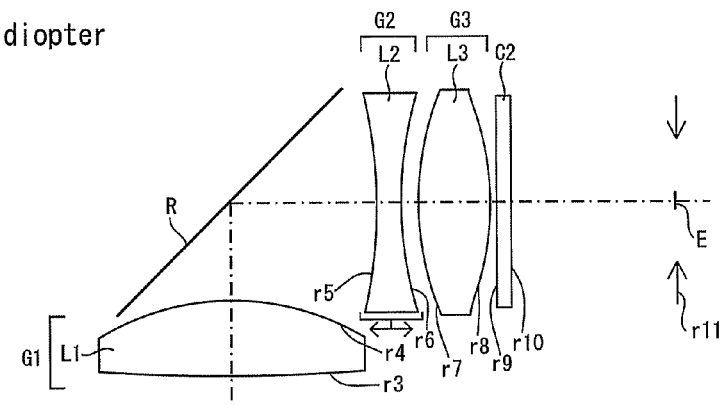
FIG. 4 is a set of sectional views of the eyepiece optical system according to Inventive Example 4 as taken apart along the optical axis.
Figure 4:
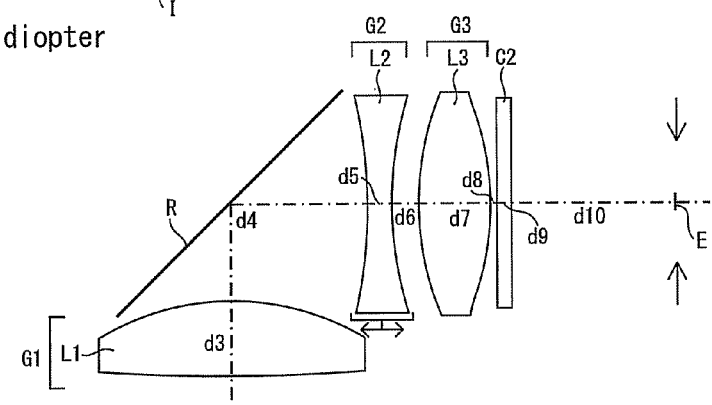
Figure 4:
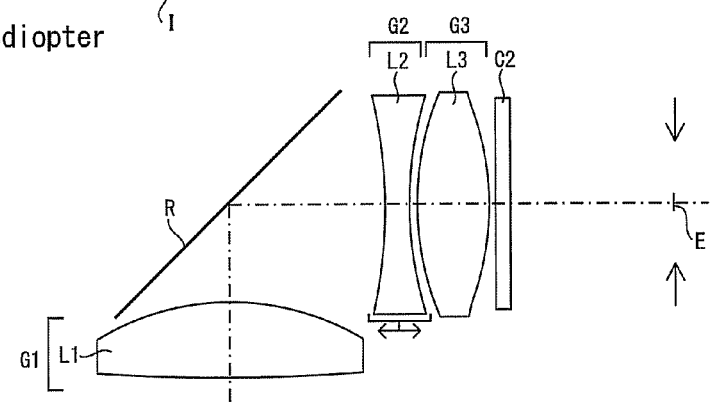
Figure 5:
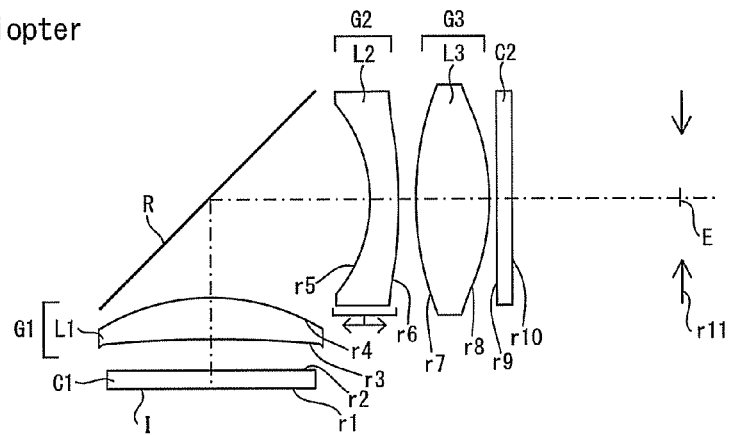
FIG. 5 is a set of sectional views of the eyepiece optical system according to Inventive Example 5 as taken apart along the optical axis.
Figure 5:
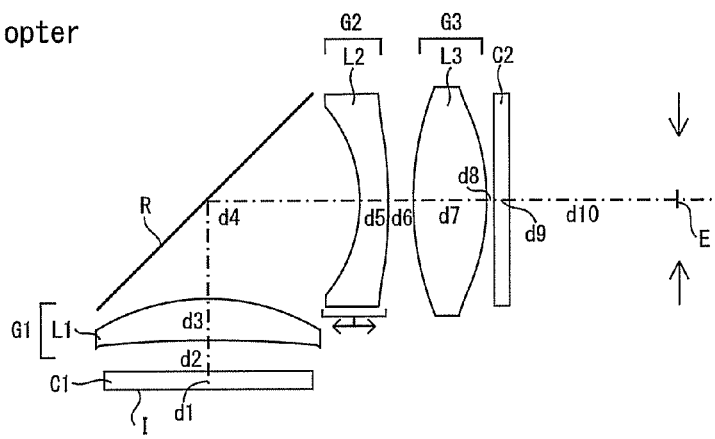
Figure 5:
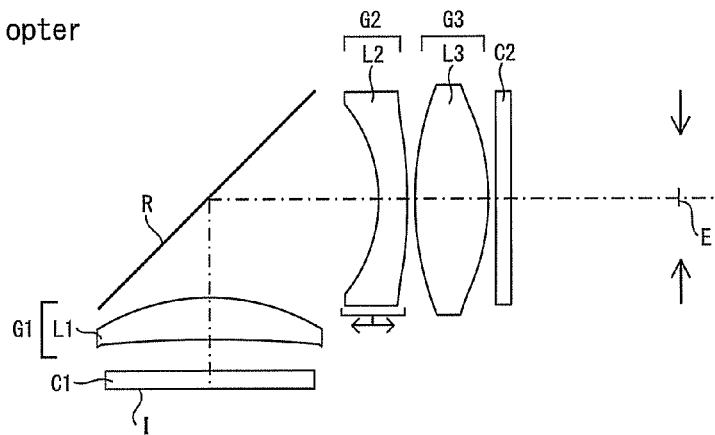

FIG. 1 is a set of sectional views of the electronic view finder according to Inventive Example 1 as taken apart along the optical axis.

The electronic view finder of Example 1 is built up of an image display device I such as a liquid crystal display device (LCD) on which images are displayed, and an eyepiece optical system O. In FIG. 1, E is indicative of an eye point (virtual stop), and C1 and C2 are each indicative of a cover glass.

The eyepiece optical system O is made up of, in order from a display plane (object side) on which the image display device I is located toward a viewing side (exit side), a first lens component G1, a second lens component G2 and a third lens component G3 as well as a reflecting member having a reflective surface R capable of deflecting an optical axis 90° across the optical path taken through the first lens component G1 and the second lens component G2. Note here that the reflecting member is formed of a surface reflection plate.

The first lens component G1 consists of a single lens L1 having positive refracting power. The single lens L1 here is of positive meniscus shape that is convex on its exit side.

The second lens component G2 consists of a single lens L2 having negative refracting power. The single lens L2 here is of negative meniscus shape that is convex on its exit side.

The third lens component G3 consists of a single lens L3 having positive refracting power. The single lens L3 here is of double-convex shape that is convex on both its surface side and exit side.

Five aspheric surfaces are applied: one to the exit-side surface r4 of the lens L1 forming the first lens component G1, two to both surfaces r5 and r6 of the single lens L2 forming the second lens component G2 and two to both surfaces r7 and r8 of the single lens L3 forming the third lens component G3.

The image display device I is provided at the display plane with the cover glass C1, and the eyepiece optical system O is provided on the exit side with the exit window member C2 to prevent dusts from making way into the optical system.

Diopter adjustment is implemented by moving the second lens component G2 (lens L2) in the optical axis direction. Both the first lens component G1 (lens L1) and the third lens component G3 (lens L3) remain fixed. For an increasing diopter, the second lens component G2 moves toward the object side, and for a decreasing diopter, it moves toward the exit side.

Figure 6:
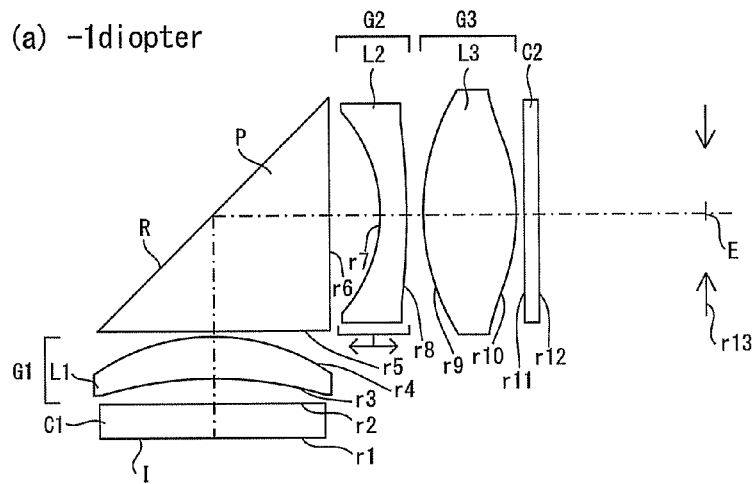
FIG. 6 is a set of sectional views of the eyepiece optical system according to Inventive Example 6 as taken apart along the optical axis.
Figure 6:
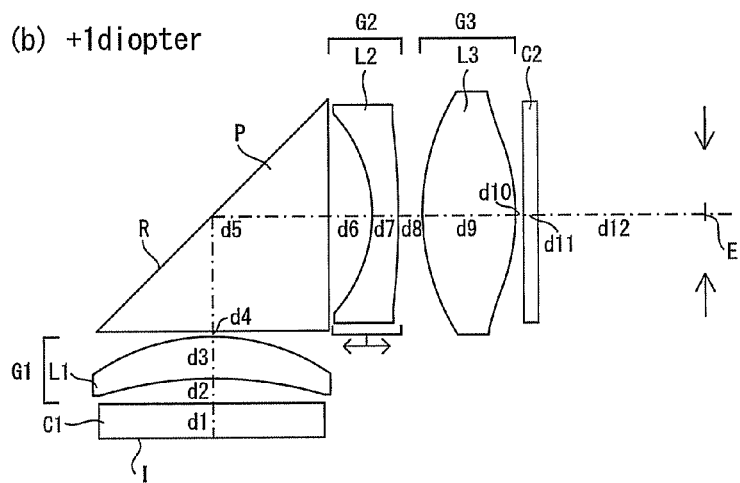
Figure 6:
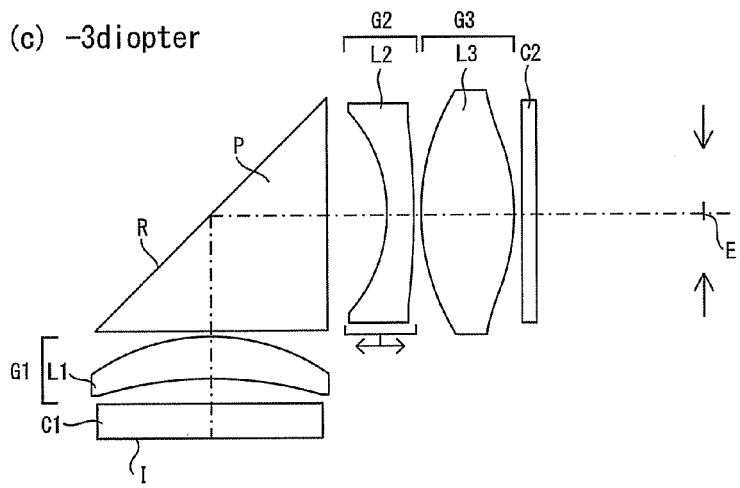
Figure 7:
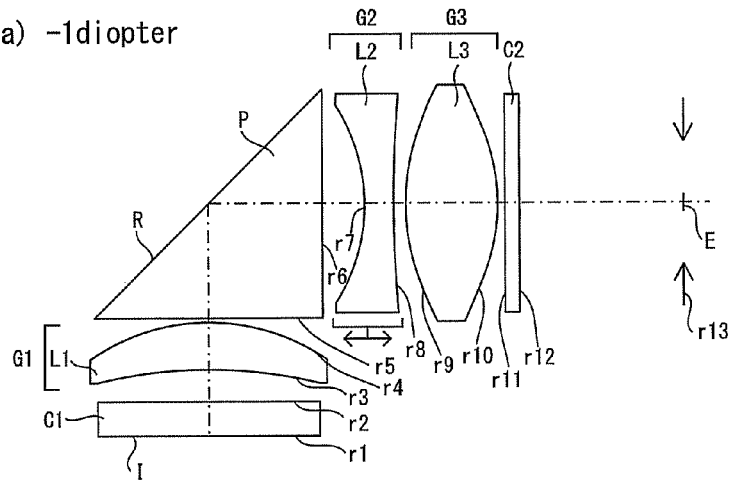
FIG. 7 is a set of sectional views of the eyepiece optical system according to Inventive Example 7 as taken apart along the optical axis.
Figure 7:
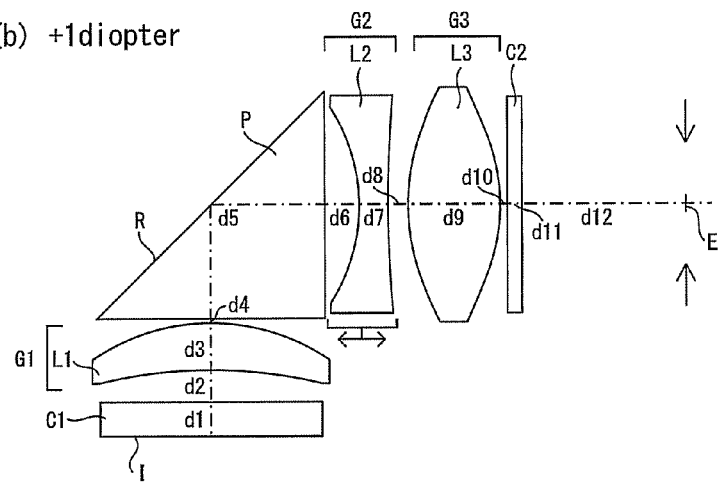
Figure 7:
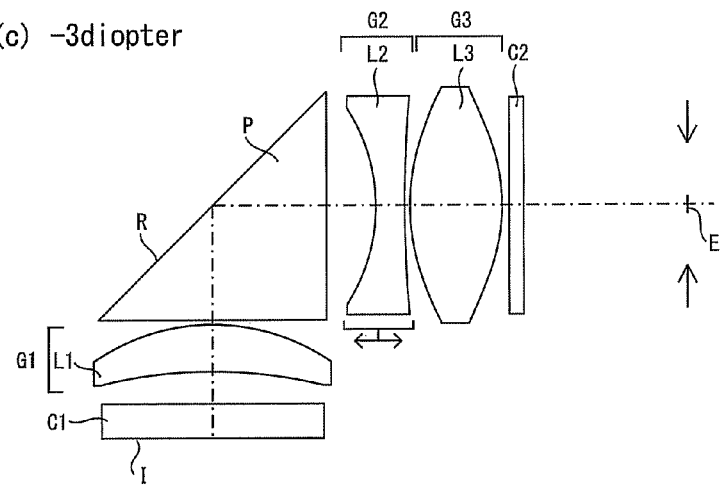
Figure 8:
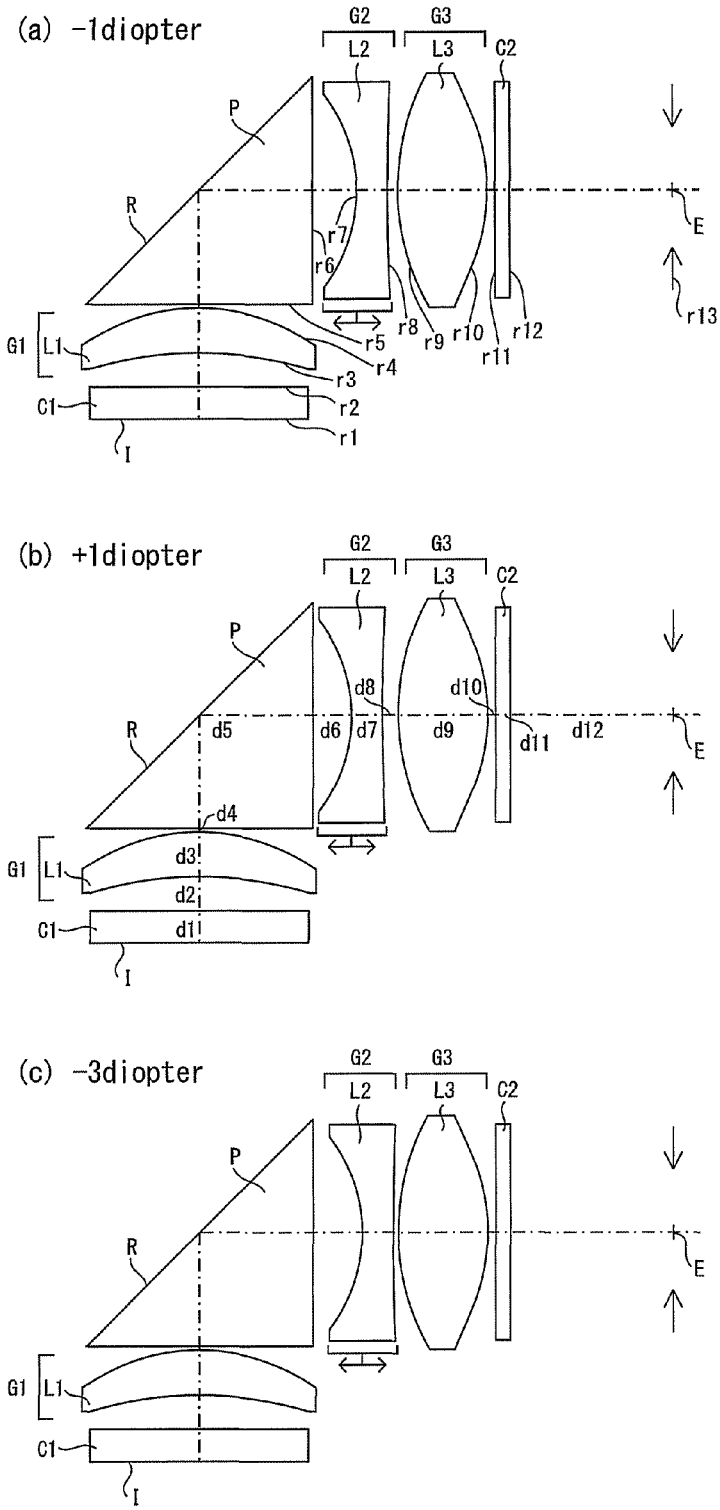
FIG. 8 is a set of sectional views of the eyepiece optical system according to Inventive Example 8 as taken, apart along the optical axis.
Figure 9:
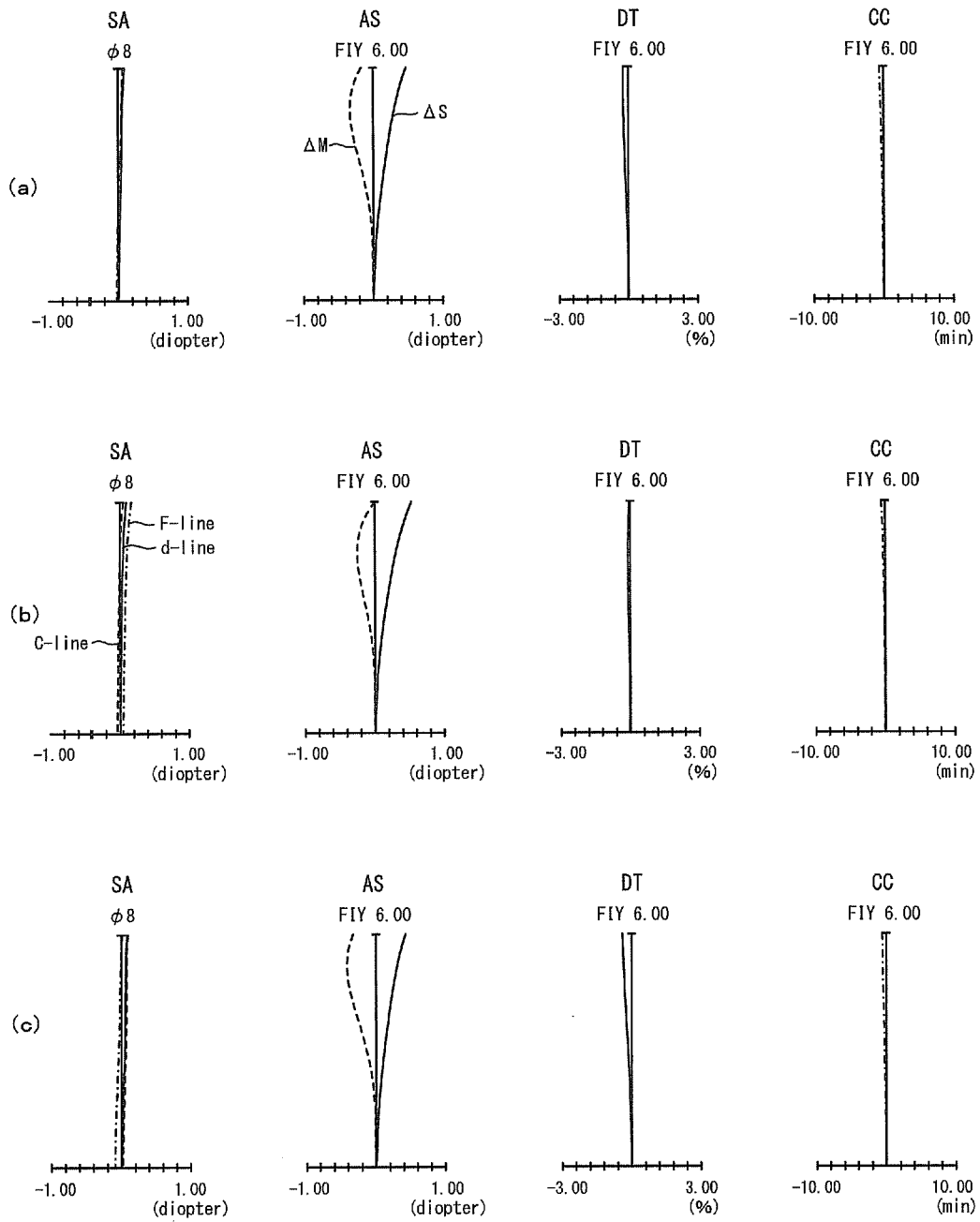
FIG. 9 is a set of aberration diagrams for the eyepiece optical system according to Inventive Example 1.
Figure 10:
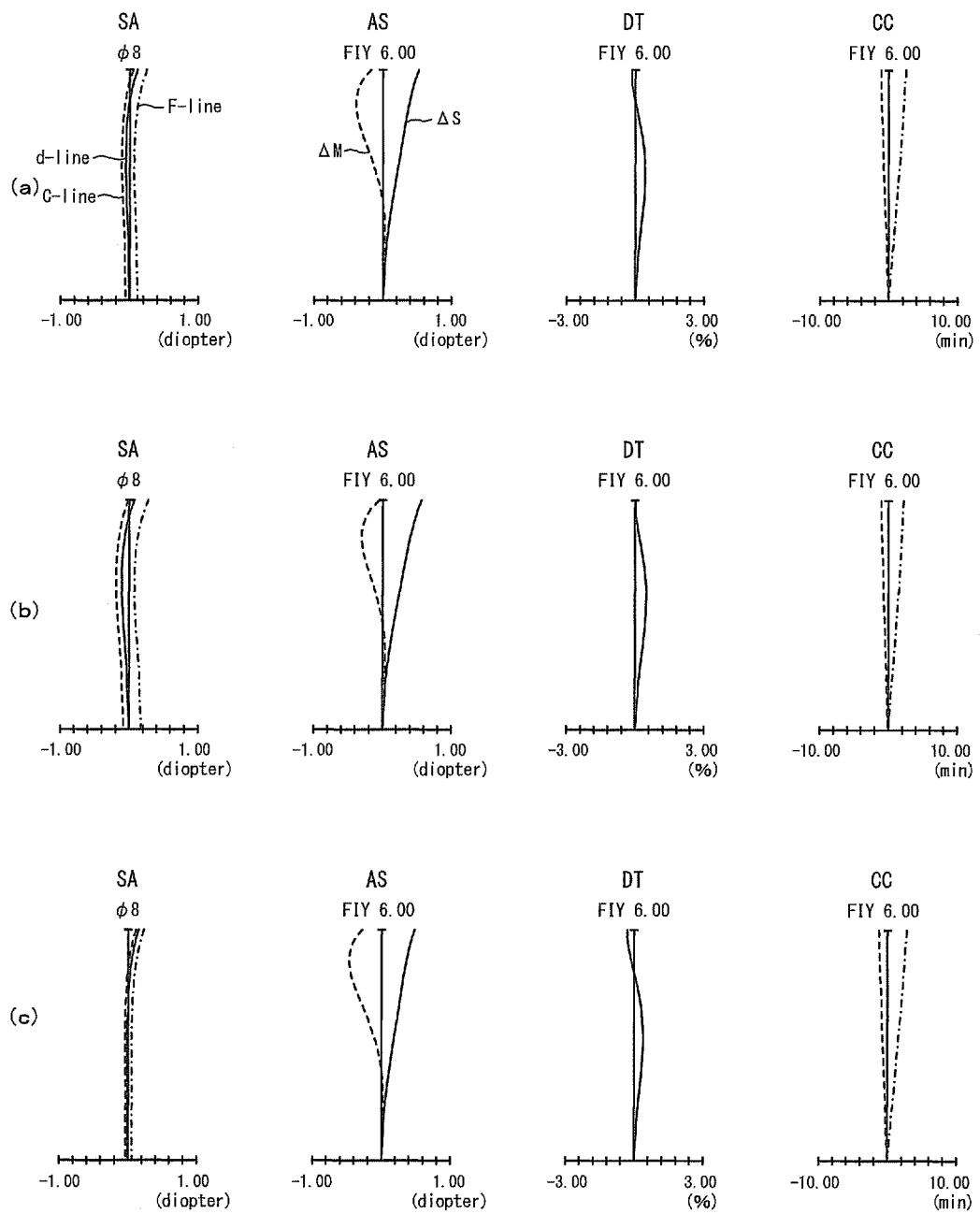
FIG. 10 is a set of aberration diagrams for the eyepiece optical system according to Inventive Example 2.
Figure 11:
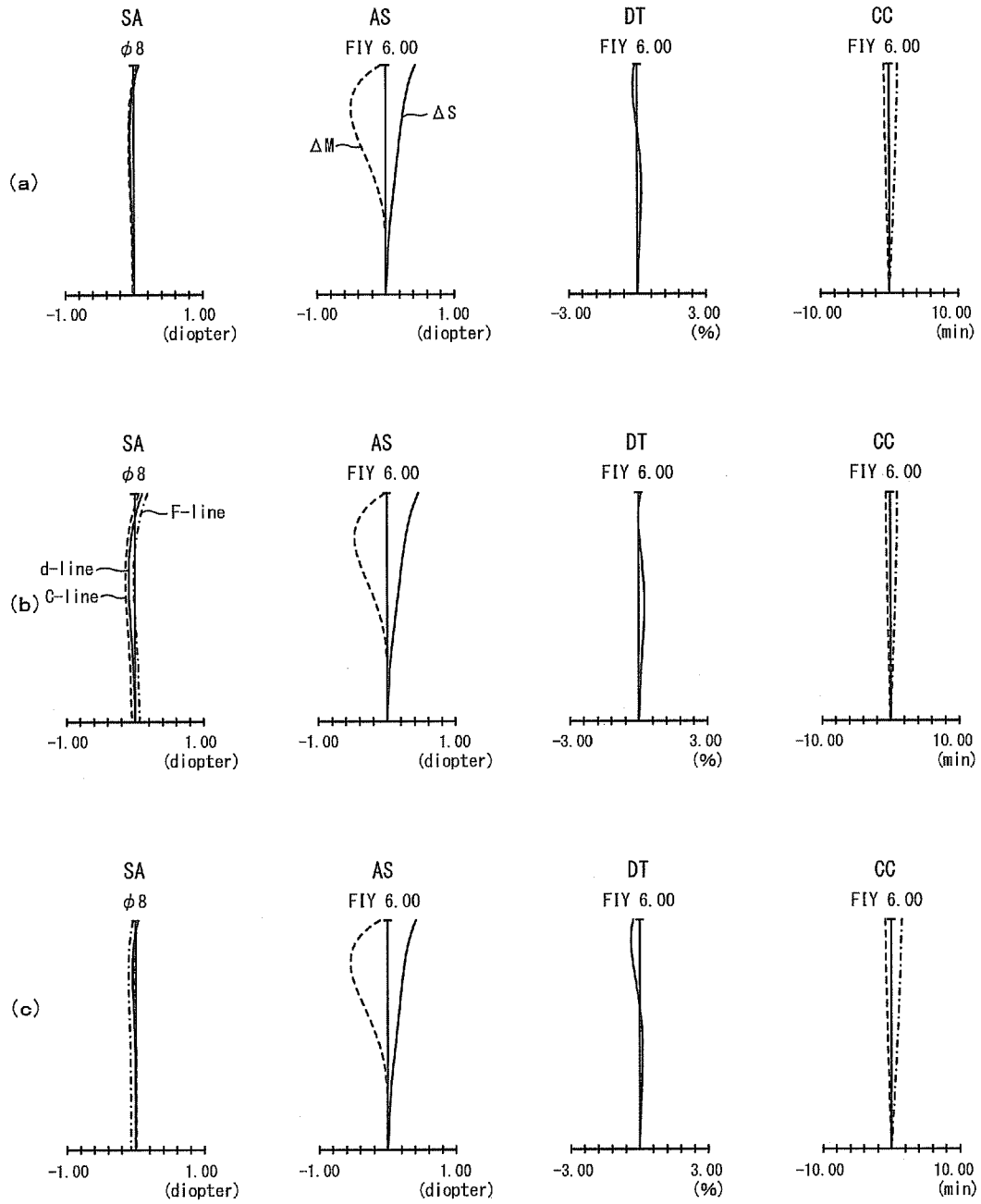
FIG. 11 is a set of aberration diagrams for the eyepiece optical system according to Inventive Example 3.
Figure 12:
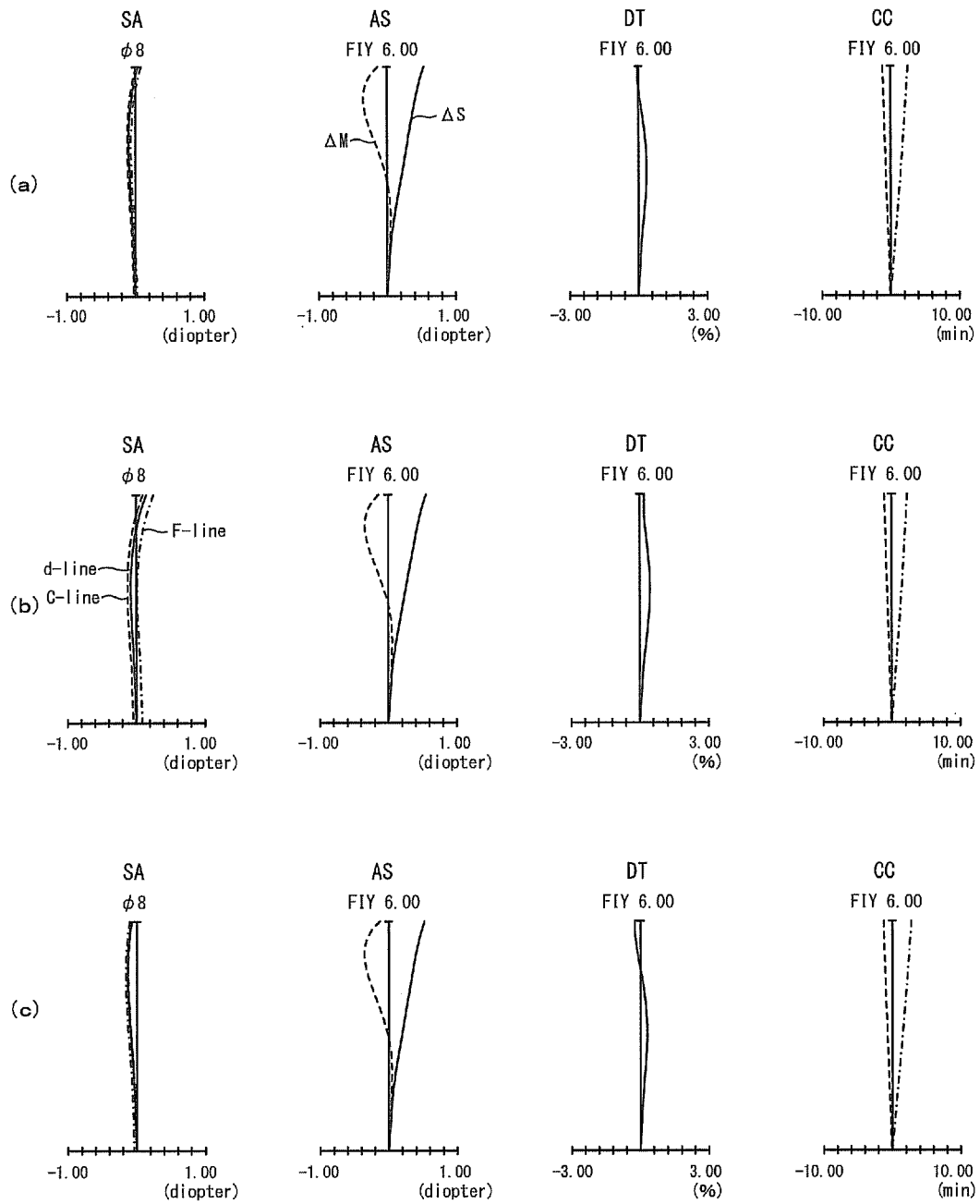
FIG. 12 is a set of aberration diagrams for the eyepiece optical system according to Inventive Example 4.
Figure 13:
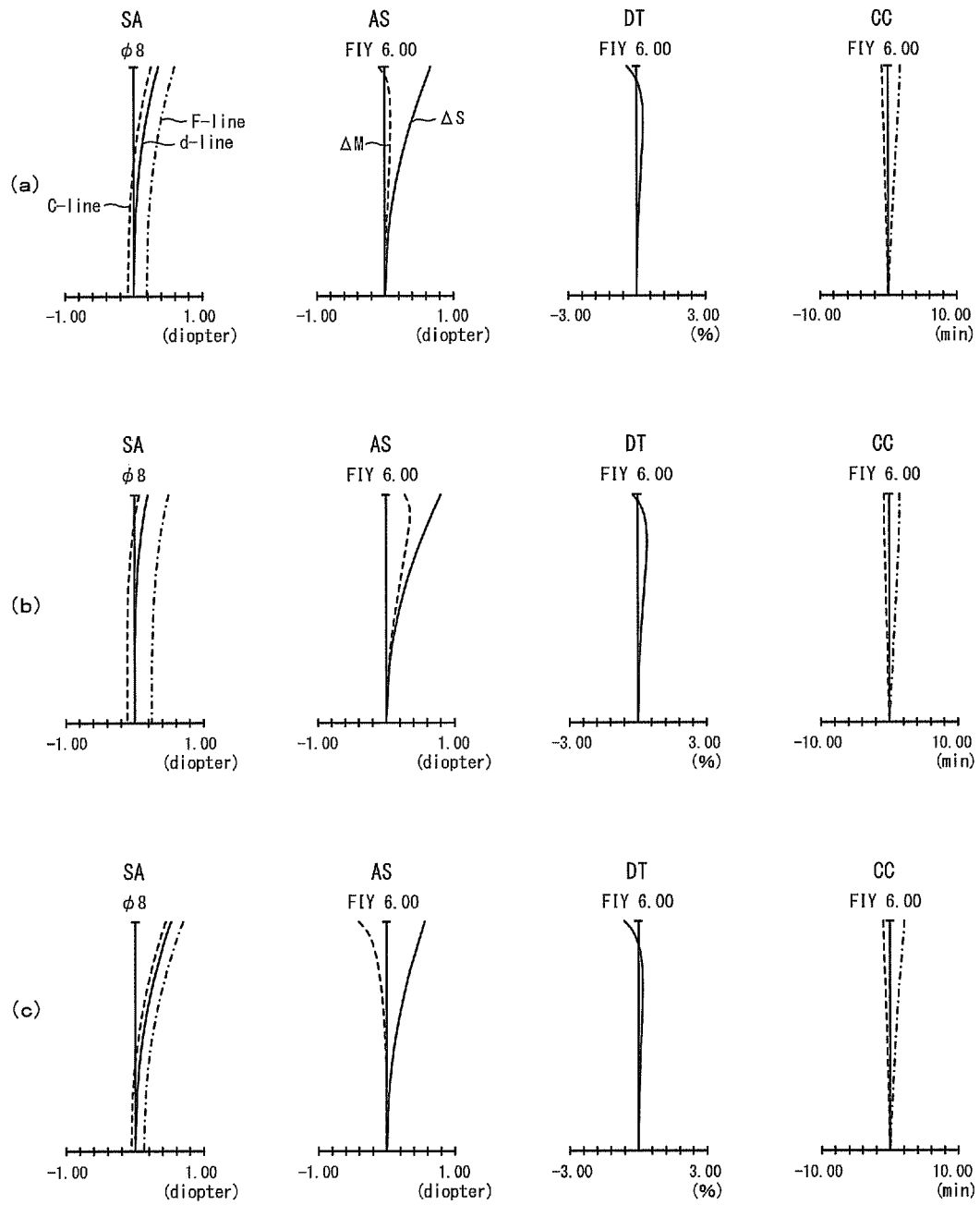
FIG. 13 is a set of aberration diagrams for the eyepiece optical system according to Inventive Example 5.
Figure 14:
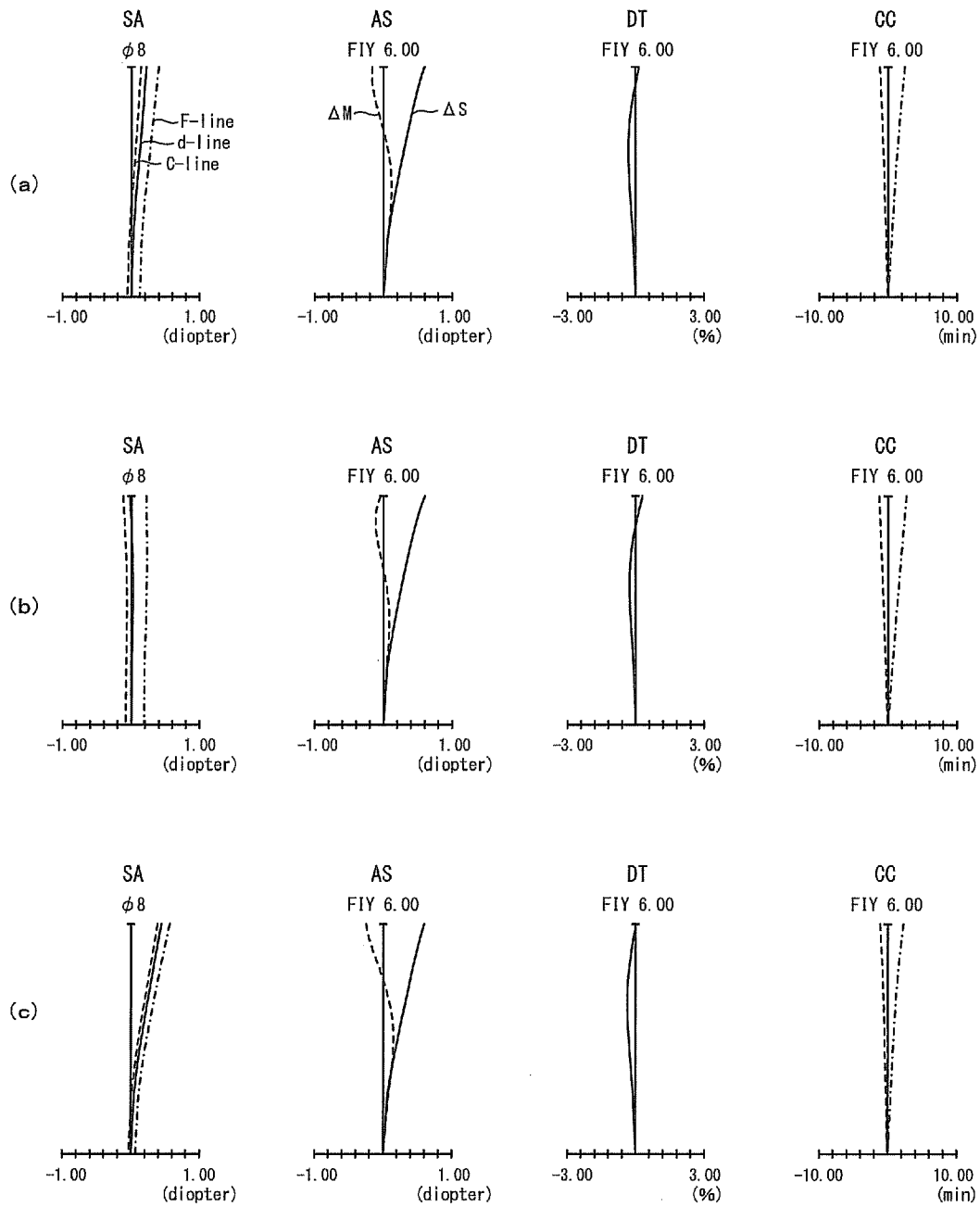
FIG. 14 is a set of aberration diagrams for the eyepiece optical system according to Inventive Example 6.
Figure 15:
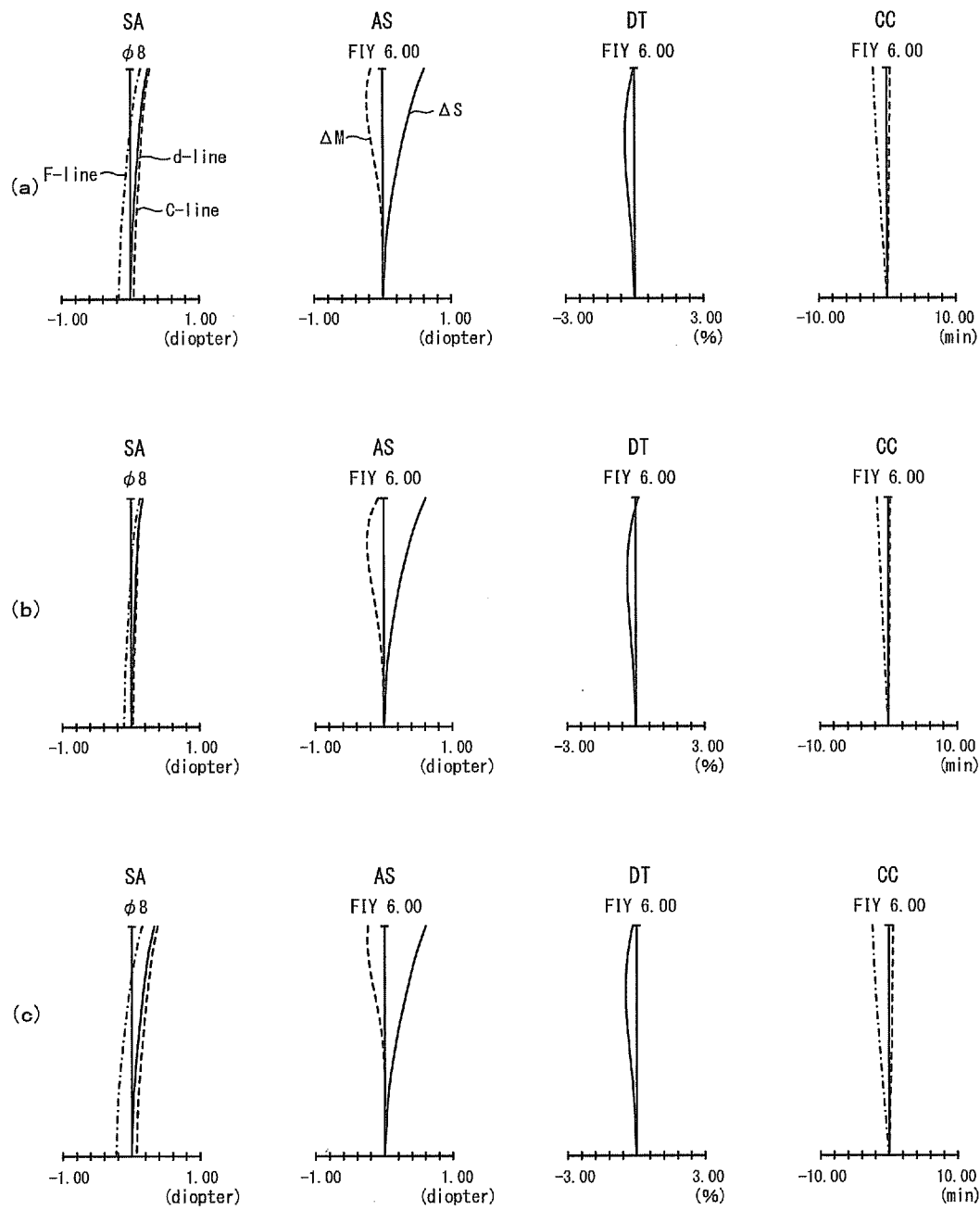
FIG. 15 is a set of aberration diagrams for the eyepiece optical system according to Inventive Example 7.
Figure 16:
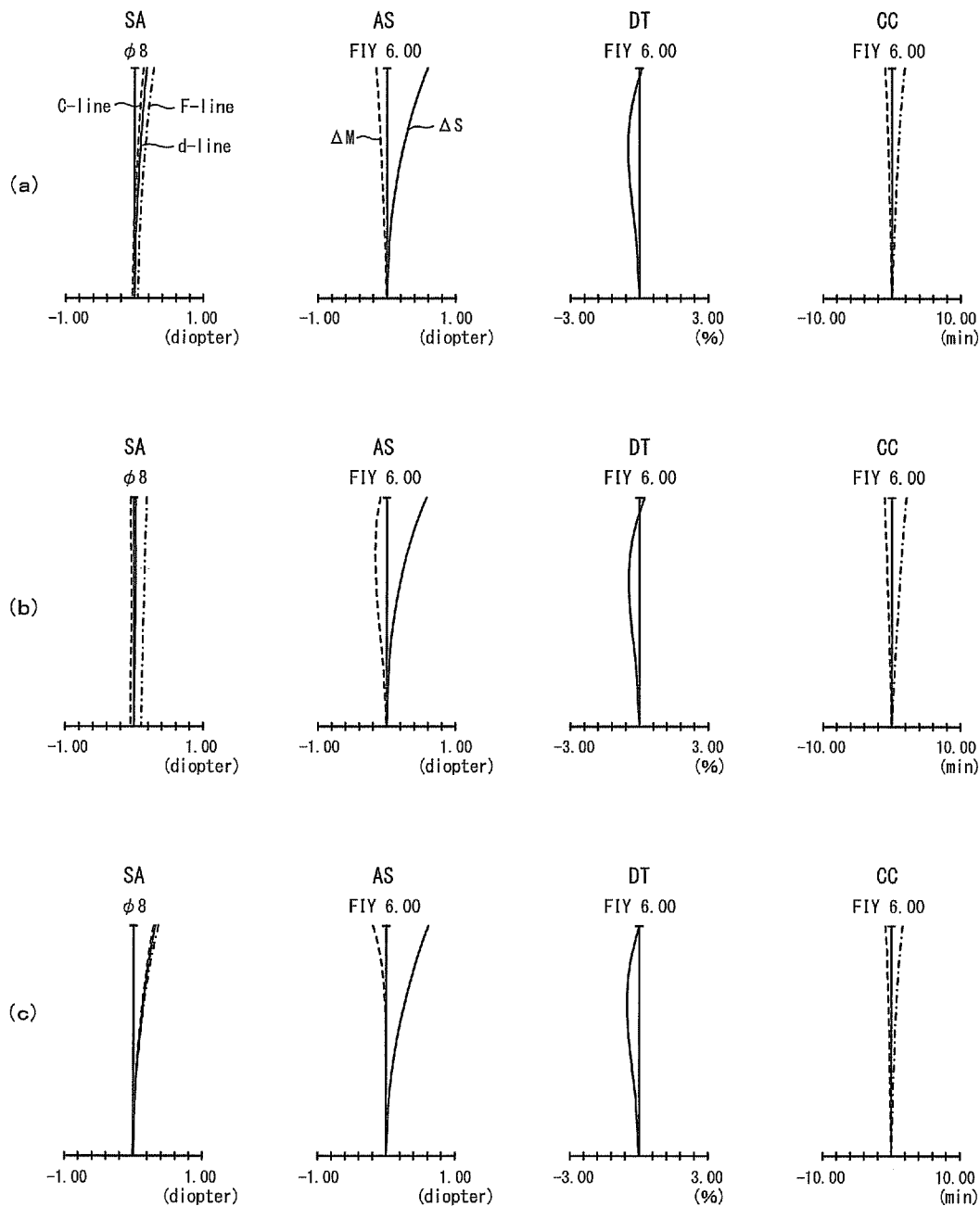
FIG. 16 is a set of aberration diagrams for the eyepiece optical system according to Inventive Example 8.

FIGS. 2 to 8 are sets of sectional views of the electronic view finders according to Examples 2 to 8, respectively, as taken apart along the optical axis. Those exemplified eyepiece optical systems are substantially the same in construction as that explained with reference to Example 1. Note here that Examples 6, 7 and 8 shown in FIGS. 6, 7 and 8 are different from Examples 1 to 5 in that a right-angle prism having a reflective surface R capable of back-surface reflection is adopted as the reflecting member having the reflective surface R.

Tabulated below are numeral data sets of Examples 1 to 8 inclusive of surface data, aspheric data, variable separation data, data set 1 and data set 2.

The surface data here include the radius of curvature r, and surface separation d of the lens surface (optical surface) for each surface number, the d-line (587.6 nm) refractive index nd of each lens (optical medium), and the d-line Abbe constant vd of each lens (optical medium). The radius of curvature r and surface separation d are each given in mm. Of the surface data, the asterisk "*" affixed to the right side of the surface number means that the surface of that lens is in aspheric surface shape, and "INF" attached to the radius of curvature means infinity.

The aspheric surface data include data on the aspheric lens surfaces of the surface data. Here let x be an optical axis provided that the direction of travel of light is positive, and y be a direction orthogonal to the optical axis. Then, aspheric shape is given by:

$$x = (y^2/r)/\left[1 + \{1 - (K+1)(y/r)^2\}^{1/2}\right] + A4y^4 + A6y^6 + A8y^8 + A10y^{10} + \ldots$$

where r is the paraxial radius of curvature, K is the conic coefficient, and A4, A6, A8 and A10 are the $4^{th}$-, $6^{th}$-, $8^{th}$- and $10^{th}$-order aspheric coefficients. Not here that the capital "E" indicates that the numeral value subsequent to it is a power exponent having 10 as a basis. For instance, "1.0E-5" means "$1.0 \times 10^{-5}$".

The variable separation data are data indicating the surface separation d that varies with movement of the second lens component G2 during diopter adjustment, including values at −1 diopter, +1 diopter, and −3 diopter. As is the case with the surface separation data d, the separation data are given in mm.

In data set 1, the angle of field that varies with movement of the second lens component G2 and the focal length of the whole eyepiece optical system are given for each diopter. The angle unit (deg) according to the frequency method is used for the angle of field, and the focal length is indicated in mm.

Set out in data set 2 are the focal length F1 of the first lens component G1, the focal length F2 of the second lens component G2 and the focal length F3 of the third lens component G3 as well as the full length, the pupil diameter, and the maximum height at the display plane, all indicated in mm. Note here that the full length is defined by the distance from the display plane of the image display device I at −1 diopter to the exit-side surface of the exit window member.

In each of the examples, the second lens component G2 is so close to the third lens component G3 that coma, spherical aberrations, distortion and astigmatism can be efficiently corrected at the exit-side surface of the second lens component G2 and the object-side surface of the third lens component G3.

Further in each example, the distance between the first lens component G1 and the second lens component G2 is so long that aberrations remaining undercorrected by a combined system of the second and third lens components G2 and G3 can be corrected at the first lens component G1. The separation between the first lens component G1 and the second lens group G2 being as wide as possible works in favor of correction of aberrations.

Further in each example, the reflective surface R being interposed between the first lens component G1 and the second lens component G2 works more in favor of correction of aberrations, and enables the length of the optical system to be curtailed (reduced) in the exit direction.

Numerical Example 1

| Unit mm | | | | |
|---|---|---|---|---|
| Surface Data | | | | |
| Surface No. | r | d | nd | vd |
| 1(Display Plane) | INF | 1.2 | 1.51633 | 64.14 |
| 2 | INF | 3.0104 | | |
| 3 | −42.803 | 4.8686 | 1.5311 | 55.91 |
| 4* | −13.2295 | D1(Variable) | | |
| 5* | −10.6971 | 1.0000 | 1.63493 | 23.90 |
| 6* | −42.9566 | D2(Variable) | | |
| 7* | 16.5376 | 6.9358 | 1.5311 | 55.91 |
| 8* | −15.6307 | 0.5 | | |
| 9 | INF | 1 | 1.51633 | 64.14 |
| 10 | INF | 10.63 | | |
| 11(Virtual Stop) | INF | | | |

| Aspheric Data |
|---|
| $4^{th}$ Surface |
| K = 0 |
| A4 = 3.6139E−05 |
| A6 = −3.2921E−07 |
| A8 = 1.7284E−09 |
| $5^{th}$ Surface |
| K = 0.0778 |
| A4 = 6.8222E−04 |
| A6 = −1.0265E−05 |
| A8 = 1.5609E−07 |
| A10 = −2.4958E−09 |
| $6^{th}$ Surface |
| K = 2.9954 |
| A4 = 5.2026E−04 |
| A6 = −7.0379E−06 |
| $7^{th}$ Surface |
| K = 1.4668 |
| A4 = −1.1340E−04 |
| A6 = 1.1113E−07 |

-continued

Unit mm

8th Surface

K = −1.1538
A4 = 4.6687E−05
A6 = −5.7404E−07
A8 = 1.2553E−08

Variable Separation Data

| Diopter | −1 | +1 | −3 |
|---|---|---|---|
| D1(Variable) | 14.95511 | 14.26430 | 15.63614 |
| D2(Variable) | 1.04941 | 1.74022 | 0.36838 |

Data Set 1

| Diopter | −1 | +1 | −3 |
|---|---|---|---|
| Angle of Field | 26.32 | 26.64 | 26.02 |
| Focal Length | 25.6333 | 25.2998 | 25.9212 |

Data Set 2

| F1 | 34.1050 |
|---|---|
| F2 | −22.7077 |
| F3 | 16.3533 |
| Full Length | 34.52 |
| Pupil Diameter | 8 |
| Maximum Height at the Display Plane | 6 |

Numerical Example 2

Unit mm
Surface Data

| Surface No. | r | d | nd | vd |
|---|---|---|---|---|
| 1 (Display Plane) | INF | 1.2 | 1.51633 | 64.14 |
| 2 | INF | 5.2284 | | |
| 3 | 100.0162 | 3.8106 | 1.5311 | 55.91 |
| 4* | −16.2113 | D1 (Variable) | | |
| 5* | −9.2408 | 1.2275 | 1.58423 | 30.49 |
| 6* | −29.8584 | D2 (Variable) | | |
| 7* | 18.6248 | 4.7108 | 1.5311 | 55.91 |
| 8* | −16.0712 | 0.5 | | |
| 9 | INF | 1 | 1.51633 | 64.14 |
| 10 | INF | 10.63 | | |
| 11 (Virtual Stop) | INF | | | |

Aspheric Data

4th Surface

K = 0
A4 = −1.7492E−05
A6 = 1.4131E−06
A8 = −1.2801E−08

5th Surface

K = 0.1
A4 = 8.4385E−04
A6 = −8.5325E−06
A8 = 6.2522E−08
A10 = −7.7310E−10

6th Surface

K = 3.3033
A4 = 5.9983E−04
A6 = −6.8893E−06

7th Surface

K = 1.5701
A4 = −7.0983E−05
A6 = 2.4440E−07

-continued

8th Surface

K = −1.1551
A4 = 8.0714E−05
A6 = −1.4121E−06
A8 = 2.0254E−08

Variable Separation Data

| Diopter | −1 | +1 | −3 |
|---|---|---|---|
| D1 (Variable) | 16.30199 | 15.58175 | 17.00795 |
| D2 (Variable) | 1.09722 | 1.81746 | 0.39126 |

Data Set 1

| | | | |
|---|---|---|---|
| Angle of Field | 26.09 | 26.30 | 25.9 |
| Focal Length | 25.7209 | 25.8146 | 25.5676 |

Data Set 2

| F1 | 26.5687 |
|---|---|
| F2 | −23.4206 |
| F3 | 17.0465 |
| Full Length | 35.08 |
| Pupil Diameter | 8 |
| Maximum Height at the Display Plane | 6 |

Numerical Example 3

Unit mm
Surface Data

| Surface No. | r | d | nd | vd |
|---|---|---|---|---|
| 1 (Display Plane) | INF | 1.2 | 1.51633 | 64.14 |
| 2 | INF | 6.4401 | | |
| 3 | 100.0119 | 4.6297 | 1.5311 | 55.91 |
| 4* | −16.1376 | D1 (Variable) | | |
| 5* | −9.8072 | 1 | 1.58423 | 30.49 |
| 6* | −21.7116 | D2 (Variable) | | |
| 7* | 21.4061 | 4.7108 | 1.5311 | 55.91 |
| 8* | −19.2907 | 0.5 | | |
| 9 | INF | 1 | 1.51633 | 64.14 |
| 10 | INF | 10.63 | | |
| 11 (Virtual Stop) | INF | | | |

Aspheric Data

4th Surface

K = 0
A4 = 2.2869E−05
A6 = 8.2948E−07
A8 = −8.9105E−09

5th Surface

K = 0.0726
A4 = 1.2808E−03
A6 = −1.9375E−05
A8 = 1.8191E−07
A10 = −2.2575E−09

6th Surface

K = 3.3025
A4 = 1.0328E−03
A6 = −1.2921E−05

7th Surface

K = 1.7661
A4 = −7.9612E−05
A6 = 8.5137E−07

-continued

8th Surface

K = −1.1497
A4 = 3.7413E−05
A6 = −1.6633E−06
A8 = 3.2299E−08

Variable Separation Data

| Diopter | −1 | +1 | −3 |
|---|---|---|---|
| D1 (Variable) | 16.28951 | 15.28172 | 17.27129 |
| D2 (Variable) | 1.43947 | 2.44726 | 0.45768 |

Data Set 1

| | | | |
|---|---|---|---|
| Angle of Field | 25.95 | 26.09 | 25.82 |
| Focal Length | 25.8661 | 26.0552 | 25.6010 |

Data Set 2

| | |
|---|---|
| F1 | 26.5303 |
| F2 | −29.1209 |
| F3 | 19.9043 |
| Full Length | 37.21 |
| Pupil Diameter | 8 |
| Maximum Height at the Display Plane | 6 |

Numerical Example 4

Unit mm
Surface Data

| Surface No. | r | d | nd | vd |
|---|---|---|---|---|
| 1 (Display Plane) | INF | 1.2 | 1.51633 | 64.14 |
| 2 | INF | 7.1972 | | |
| 3 | 99.7010 | 4.8785 | 1.5311 | 55.91 |
| 4* | −15.5259 | D1 (Variable) | | |
| 5* | −21.1742 | 1.5140 | 1.58423 | 30.49 |
| 6* | −29.9717 | D2 (Variable) | | |
| 7* | 15.4538 | 4.7108 | 1.5311 | 55.91 |
| 8* | −18.3719 | 0.5 | | |
| 9 | INF | 1 | 1.51633 | 64.14 |
| 10 | INF | 10.63 | | |
| 11 (Virtual Stop) | INF | | | |

Aspheric Data

4th Surface

K = 0
A4 = 3.4162E−05
A6 = 7.6389E−07
A8 = −6.7238E−09

5th Surface

K = 0.0096
A4 = 4.4351E−04
A6 = −6.9324E−06
A8 = 5.7363E−08
A10 = −6.5437E−10

6th Surface

K = 3.2945
A4 = 3.0564E−04
A6 = −4.7336E−06

7th Surface

K = 1.4259
A4 = −1.0151E−04
A6 = −1.0576E−06

8th Surface

K = −1.1652
A4 = 6.4888E−05
A6 = −1.9149E−06
A8 = 1.7688E−08

Variable Separation Data

| Diopter | −1 | +1 | −3 |
|---|---|---|---|
| D1 (Variable) | 16.16742 | 15.53037 | 16.79764 |
| D2 (Variable) | 1.09033 | 1.72737 | 0.46011 |

Data Set 1

| | | | |
|---|---|---|---|
| Angle of Field | 26.12 | 26.30 | 25.64 |
| Focal Length | 25.6928 | 25.8901 | 25.4426 |

Data Set 2

| | |
|---|---|
| F1 | 25.6716 |
| F2 | −21.0091 |
| F3 | 16.6062 |
| Full Length | 38.26 |
| Pupil Diameter | 8 |
| Maximum Height at the Display Plane | 6 |

Numerical Example 5

Unit mm
Surface Data

| Surface No. | r | d | nd | vd |
|---|---|---|---|---|
| 1 (Display Plane) | INF | 1.2 | 1.51633 | 64.14 |
| 2 | INF | 1.9149 | | |
| 3 | −40.4324 | 2.7101 | 1.5311 | 55.91 |
| 4* | −13.7943 | D1 (Variable) | | |
| 5* | −8.4978 | 1.8 | 1.58423 | 30.49 |
| 6* | −31.9916 | D2 (Variable) | | |
| 7* | 19.2843 | 4.7108 | 1.5311 | 55.91 |
| 8* | −12.3869 | 0.5 | | |
| 9 | INF | 1 | 1.51633 | 64.14 |
| 10 | INF | 10.63 | | |
| 11 (Virtual Stop) | INF | | | |

Aspheric Data

4th Surface

K = 30.5132
A4 = 1.7800E−04
A6 = 1.8101E−06

5th Surface

K = 0.4498
A4 = 4.3954E−05
A6 = 6.1075E−06
A8 = 3.7898E−08
A10 = 2.6573E−09

6th Surface

K = 3.1461
A4 = 9.7513E−05
A6 = 3.2423E−06

7th Surface

K = 1.8798
A4 = −6.4692E−05
A6 = 1.3465E−07

8th Surface

K = −1.1552
A4 = 7.6612E−05
A6 = 1.8352E−07

-continued

| Variable Separation Data | | | |
|---|---|---|---|
| Diopter | −1 | +1 | −3 |
| D1 (Variable) | 15.17168 | 14.56704 | 15.76566 |
| D2 (Variable) | 1.08220 | 1.68683 | 0.48822 |

Data Set 1

| | | | |
|---|---|---|---|
| Angle of Field | 26.37 | 26.71 | 26.05 |
| Focal Length | 25.5988 | 25.1140 | 26.0520 |

Data Set 2

| | |
|---|---|
| F1 | 25.5988 |
| F2 | 25.1140 |
| F3 | 26.0521 |
| Full Length | 30.09 |
| Pupil Diameter | 8 |
| Maximum Height at the Display Plane | 6 |

Numerical Example 6

Unit mm
Surface Data

| Surface No. | r | d | nd | νd |
|---|---|---|---|---|
| 1 (Display Plane) | INF | 2.2 | 1.51633 | 64.14 |
| 2 | INF | 1.7179 | | |
| 3 | −24.8000 | 2.6577 | 1.5311 | 55.91 |
| 4* | −13.6244 | 0.3 | | |
| 5 | INF | 14.3 | 1.51680 | 64.2 |
| 6 | INF | D1 (Variable) | | |
| 7* | −8.0864 | 1.5879 | 1.58423 | 30.49 |
| 8* | −49.8787 | D2 (Variable) | | |
| 9* | 14.0228 | 6 | 1.5311 | 55.91 |
| 10* | −12.4951 | 0.5 | | |
| 11 | INF | 1 | 1.51633 | 64.14 |
| 12 | INF | 10.63 | | |
| 13 (Virtual Stop) | INF | | | |

Aspheric Data

4$^{th}$ Surface

K = 0
A4 = 6.0738E−05
A6 = −1.6702E−06

7$^{th}$ Surface

K = 0.1344
A4 = 4.1616E−04
A6 = −8.1728E−06
A8 = 1.8980E−07
A10 = 1.1916E−09

8$^{th}$ Surface

K = 0
A4 = 9.5207E−05
A6 = −4.0670E−06
A8 = 6.8437E−08

9$^{th}$ Surface

K = 0.6244
A4 = −6.4692E−05
A6 = 2.1669E−06

10$^{th}$ Surface

K = −1.2482
A4 = 6.4885E−05
A6 = 3.8895E−07
A8 = 1.7318E−08

-continued

| Variable Separation Data | | | |
|---|---|---|---|
| Diopter | −1 | +1 | −3 |
| D1 (Variable) | 3.30044 | 2.83570 | 3.75783 |
| D2 (Variable) | 1.04059 | 1.50533 | 0.58320 |

Data Set 1

| | | | |
|---|---|---|---|
| Angle of Field | 29.79 | 30.23 | 29.37 |
| Focal Length | 25.0809 | 24.2911 | 25.8862 |

Data Set 2

| | |
|---|---|
| F1 | 52.5897 |
| F2 | −16.7540 |
| F3 | 13.5007 |
| Full Length | 34.60 |
| Pupil Diameter | 8 |
| Maximum Height at the Display Plane | 6.6 |

Numerical Example 7

Unit mm
Surface Data

| Surface No. | r | d | nd | νd |
|---|---|---|---|---|
| 1 (Display Plane) | INF | 2.2 | 1.51633 | 64.14 |
| 2 | INF | 2.1639 | | |
| 3 | −27.6995 | 3.0245 | 1.5311 | 55.91 |
| 4* | −13.3307 | 0.3000 | | |
| 5 | INF | 14.3042 | 1.51680 | 64.20 |
| 6 | INF | D1 (Variable) | | |
| 7* | −11.7762 | 1.8990 | 1.58423 | 30.49 |
| 8* | 54.0346 | D2 (Variable) | | |
| 9* | 12.4124 | 6 | 1.5311 | 55.91 |
| 10* | −12.4951 | 0.5 | | |
| 11 | INF | 1 | 1.51633 | 64.14 |
| 12 | INF | 10.63 | | |
| 13 (Virtual Stop) | INF | | | |

Aspheric Data

4$^{th}$ Surface

K = 0
A4 = 6.9761E−05
A6 = −9.8963E−07

7$^{th}$ Surface

K = 0.1548
A4 = 1.0090E−04
A6 = −5.0657E−06
A8 = 1.0693E−07
A10 = −4.3229E−10

8$^{th}$ Surface

K = 0
A4 = −6.0848E−05
A6 = −1.0241E−06
A8 = 2.1110E−08

9$^{th}$ Surface

K = 0.4197
A4 = −2.9642E−04
A6 = 2.5830E−06
A8 = 2.1110E−08

10$^{th}$ Surface

K = −1.1552
A4 = 1.8040E−05
A6 = 8.4076E−07
A8 = 1.8138E−09

-continued

Variable Separation Data

| Diopter | −1 | +1 | −3 |
|---|---|---|---|
| D1 (Variable) | 2.85122 | 2.46201 | 3.22834 |
| D2 (Variable) | 0.77761 | 1.16682 | 0.40049 |

Data Set 1

| | | | |
|---|---|---|---|
| Angle of Field | 30.30 | 30.75 | 29.88 |
| Focal Length | 24.5508 | 23.8638 | 25.2339 |

Data Set 2

| | |
|---|---|
| F1 | 45.0947 |
| F2 | −15.0596 |
| F3 | 12.5729 |
| Full Length | 35.02 |
| Pupil Diameter | 8 |
| Maximum Height at the Display Plane | 6.6 |

Numerical Example 8

Unit mm
Surface Data

| Surface No. | r | d | nd | vd |
|---|---|---|---|---|
| 1 (Display Plane) | INF | 2.2 | 1.51633 | 64.14 |
| 2 | INF | 2.1695 | | |
| 3 | −28.3727 | 2.9929 | 1.5311 | 55.91 |
| 4* | −13.3710 | 0.3 | | |
| 5 | INF | 14.3 | 1.51680 | 64.20 |
| 6 | INF | D1 (Variable) | | |
| 7* | −10.3792 | 1.9513 | 1.58423 | 30.49 |
| 8* | 54.4116 | D2 (Variable) | | |
| 9* | 12.6148 | 6 | 1.5311 | 55.91 |
| 10* | −11.7019 | 0.5 | | |
| 11 | INF | 1 | 1.51633 | 64.14 |
| 12 | INF | 10.63 | | |
| 13 (Virtual Stop) | INF | | | |

Aspheric Data

4$^{th}$ Surface

K = 0
A4 = 7.4613E−05
A6 = −1.2842E−06

7$^{th}$ Surface

K = 0.1548
A4 = 1.9589E−04
A6 = −6.7688E−06
A8 = 4.2887E−08
A10 = 1.2388E−09

8$^{th}$ Surface

K = 0
A4 = −3.0889E−05
A6 = −3.3612E−06
A8 = 4.7873E−08

9$^{th}$ Surface

K = 0.4191
A4 = −3.3388E−04
A6 = 2.6730E−06
A8 = −9.3189E−09

10$^{th}$ Surface

K = −1.2504
A4 = 5.2741E−06
A6 = 3.2098E−07
A8 = 1.2267E−08

Variable Separation Data

| Diopter | −1 | +1 | −3 |
|---|---|---|---|
| D1 (Variable) | 2.89086 | 2.51790 | 3.29902 |
| D2 (Variable) | 0.67841 | 1.05138 | 0.30326 |

Data Set 1

| | | | |
|---|---|---|---|
| Angle of Field | 30.17 | 30.60 | 29.76 |
| Focal Length | 24.6935 | 24.0164 | 25.3922 |

Data Set 2

| | |
|---|---|
| F1 | 44.5333 |
| F2 | −14.7557 |
| F3 | 12.5001 |
| Full Length | 34.98 |
| Pupil Diameter | 8 |
| Maximum Height at the Display Plane | 6.6 |

FIGS. 9 to 16 are sets of aberration diagrams for Examples 1 to 8. In these aberration diagrams, (a), (b) and (c) are indicative of spherical aberrations (SA), astigmatism (AS), distortion (DT) and chromatic aberration of magnification (CC) at −1 diopter, +1 diopter and −3 diopter, respectively, and "φ" and "FIY" are indicative of the pupil diameter and the maximum height at the display plane, respectively.

Tabulated below are the values of Conditions (1) to (7) in Examples 1 to 8.

| | Example 1 | Example 2 | Example 3 | Example 4 | Example 5 | Example 6 | Example 7 | Example 8 |
|---|---|---|---|---|---|---|---|---|
| Condition (1) D12/DT | 0.459 | 0.491 | 0.461 | 0.445 | 0.538 | 0.474 | 0.681 | 0.685 |
| Condition (2) f1/f | 1.330 | 1.033 | 1.026 | 0.999 | 1.488 | 2.097 | 1.837 | 1.803 |
| Condition (3) f2/f | −0.886 | −0.911 | −1.126 | −0.818 | −0.796 | −0.668 | −0.613 | −0.598 |
| Condition (4) f3/f | 0.638 | 0.663 | 0.770 | 0.646 | 0.585 | 0.538 | 0.512 | 0.506 |
| Condition (5) SF1 | 1.895 | 0.721 | 0.722 | 0.731 | 2.036 | 3.438 | 2.856 | 2.783 |
| Condition (6) SF2 | −1.663 | −1.896 | −2.648 | −0.172 | −1.723 | −1.387 | −0.642 | −0.680 |
| Condition (7) SF3 | 0.028 | 0.074 | 0.052 | −0.086 | 0.218 | 0.058 | 0.016 | 0.038 |

Figure 17:
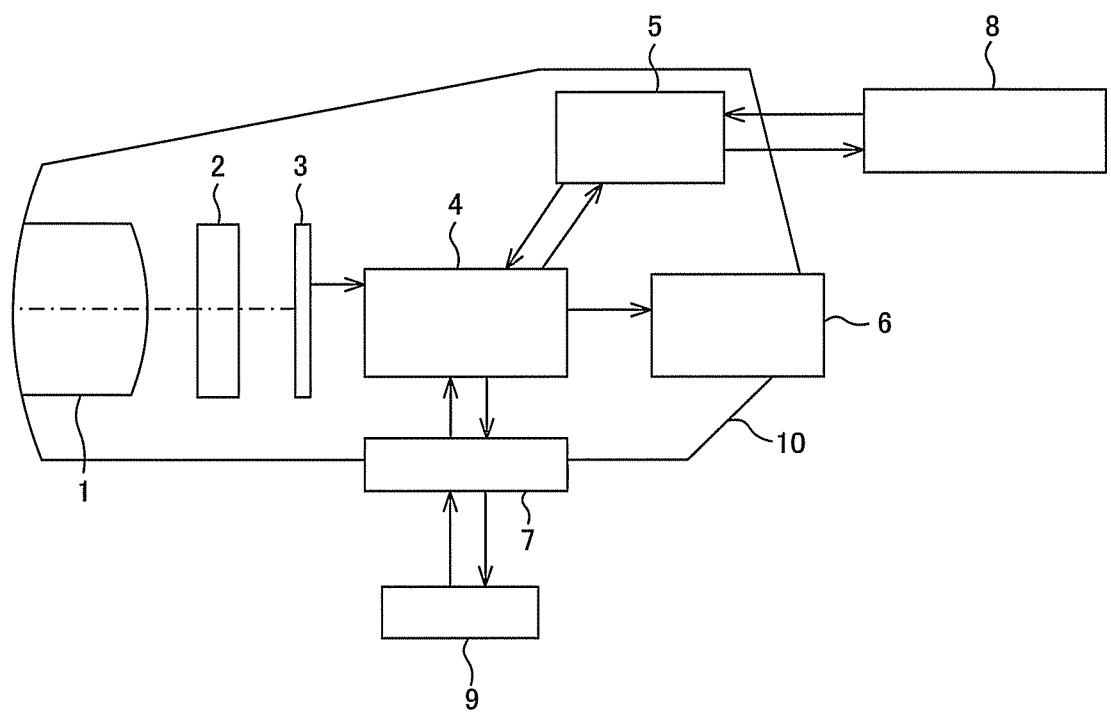
FIG. 17 is illustrative of an imaging apparatus incorporating the inventive eyepiece optical system and electronic view finder.

FIG. 17 is illustrative of one exemplary construction of a digital camera that is one example of the imaging apparatus using the inventive electronic view finder. In FIG. 17, reference numeral 10 stands for the imaging apparatus or digital camera built up of an imaging optical system 1, a filter 2, an imaging device 3, a controller 4, a built-in memory 5, an electronic view finder 6, and an interface 7.

Referring to the imaging apparatus here, the imaging optical system 1 is made up of a plurality of optical elements (such as lenses). Light emitted out of an object is collected through the imaging optical system 1, and an object image is formed on a light-collection position, where the imaging device 3 (reception plane) such as a CCD is located. The imaging device 3 is composed of an array of regularly positioned photoelectric transformation elements. To prevent the occurrence of the moiré phenomenon, the filter 2 having a low-pass function is interposed between the imaging optical system 1 and the imaging device 3. There may optionally be an infrared cut filter provided to cut infrared light.

A light beam incident on the imaging device 3 is transformed by those photoelectric transformation elements into electrical signals (image signals), which are then entered into the controller 4. The controller 4 applies a series of signal processing such as γ processing and image compression processing to the electrical signals. The electrical signals underwent the signal processing are sent out to a personal computer 9 or the like via the built-in memory 5 and interface 7.

The electronic view finder 6 is built up of a lighting system, an image display device (not shown in FIG. 17), an eyepiece optical system (eyepiece lens), and so on. Any one of the inventive eyepiece optical systems explained so far herein is used for the eyepiece optical system, and the image display device is located on the display plane. This image display device is controlled by the controller 4. Such construction permits the viewer to operate the electronic view finder 6 in such a way as to view object images taken or being taken. Image data may be transferred from the built-in memory 5 to an auxiliary memory 8. On the other hand, the same image data may be fed from the interface 7 to the personal computer 9.

While various embodiments of the invention have been explained, it is understood that the invention is not limited to those embodiments, and some combinations of the embodiments are embraced in the category of the invention too.

What is claimed is:

1. An eyepiece optical system, comprising in order from a display plane side, on which an image being viewed is formed, toward an exit side:
   a first lens component of positive refracting power,
   a reflecting member having only one reflective surface,
   a second lens component of negative refracting power, and
   a third lens component of positive refracting power,
   wherein each of the lens components is a lens block that, in an optical path involved, contacts air at only two surfaces: a display-plane-side refractive surface and an exit-side refractive surface;
   wherein a total number of reflective surfaces capable of deflecting an optical axis in the eyepiece optical system is only one, constituted by the reflective surface of the reflecting member.

2. The eyepiece optical system according to claim 1, wherein the first lens component, the second lens component and the third lens component are each a single lens.

3. The eyepiece optical system according to claim 1, which satisfies the following Condition (1):

$$0.3 < D12/DT < 0.9 \quad (1)$$

where D12 is a distance along the optical axis from an exit-side refractive surface of the first lens component to a display-surface-side refractive surface of the second lens component, and DT is a distance along the optical axis from the display plane to an exit-side refractive surface of the third lens component, provided that an optical element or elements other than the first lens component, the second lens component and the third lens component are supposed to have a length as calculated on an air basis, and when there is a variable diopter, each or the distance is supposed to have a value at −1 diopter.

4. The eyepiece optical system according to claim 1, which satisfies the following Condition (2):

$$0.5 < f1/f < 3.5 \quad (2)$$

where f1 is a focal length of the first lens component, and
   f is a focal length of the whole eyepiece optical system, provided that when there is a variable diopter, each or the focal length is supposed to have a value at −1 diopter.

5. The eyepiece optical system according to claim 1, wherein the second lens component is movable for diopter adjustment, and satisfies the following Condition (3):

$$-3.0 < f2/f < -0.3 \quad (3)$$

where f2 is a focal length of the second lens component, and
   f is a focal length of the whole eyepiece optical system, provided that when there is a variable diopter, each or the focal length is supposed to have a value at −1 diopter.

6. The eyepiece optical system according to claim 1, which satisfies the following Condition (4):

$$0.2 < f3/f < 0.99 \quad (4)$$

where f3 is a focal length of the third lens component, and
   f is a focal length of the whole eyepiece optical system, provided that when there is a variable diopter, each or the focal length is supposed to have a value at −1 diopter.

7. The eyepiece optical system according to claim 1, which satisfies the following Condition (5):

$$0.65 < SF1 < 5.0 \quad (5)$$

where SF1 is a shape factor of the first lens component, as represented by $$SF1 = (r11 + r12)/(r11 - r12)$$

where r11 is a paraxial radius of curvature of a display-plane-side refractive surface of the first lens component, and
   r12 is a paraxial radius of curvature of an exit-side refractive surface of the first lens component.

8. The eyepiece optical system according to claim 1, which satisfies the following Condition (6):

$$-4.5 < SF2 < -0.05 \quad (6)$$

where SF2 is a shape factor of the second lens component as represented by $$SF2 = (r21 + r22)/(r21 - r22)$$

where r21 is a paraxial radius of curvature of a display-plane-side refractive surface of the second lens component, and
   r22 is a paraxial radius of curvature of an exit-side refractive surface of the second lens component.

9. The eyepiece optical system according to claim 1, which satisfies the following Condition (7):

$$-0.5 < SF3 < 0.28 \quad (7)$$

where SF3 is a shape factor of the third lens component as represented by $$SF3 = (r31 + r32)/(r31 - r32)$$

where r31 is a paraxial radius of curvature of a display-plane-side refractive surface of the third lens component, and
r32 is a paraxial radius of curvature of an exit-side refractive surface of the third lens component.

10. The eyepiece optical system according to claim 1, wherein both the second lens component and the third lens component have an aspheric surface.

11. The eyepiece optical system according to claim 1, wherein an exit-side refractive surface of the first lens component is greater in an absolute value of refracting power than a display-plane-side refractive surface thereof.

12. The eyepiece optical system according to claim 1, wherein a display-plane-side refractive surface of the second lens component is greater than in an absolute value of refracting power than an exit-side refractive surface thereof.

13. The eyepiece optical system according to claim 1, wherein the third lens component is of a double-convex shape.

14. The eyepiece optical system according to claim 1, which satisfies the following Condition (1-1):

$$0.35 < D12/DT < 0.8 \quad (1\text{-}1)$$

where D12 is a distance along the optical axis from an exit-side refractive surface of the first lens component to a display-surface-side refractive surface of the second lens component, and
DT is a distance along the optical axis from the display plane to an exit-side refractive surface of the third lens component, provided that an optical element or elements other than the first lens component, the second lens component and the third lens component are supposed to have a length as calculated on an air basis, and when there is a variable diopter, each or the distance is supposed to have a value at −1 diopter.

15. The eyepiece optical system according to claim 1, which satisfies the following Condition (2-1):

$$0.7 < f1/f < 3.0 \quad (2\text{-}1)$$

where f1 is a focal length of the first lens component, and
f is a focal length of the whole eyepiece optical system, provided that when there is a variable diopter, each or the focal length is supposed to have a value at −1 diopter.

16. The eyepiece optical system according to claim 1, wherein the second lens component is movable for diopter adjustment, and satisfies the following Condition (3-1):

$$-2.0 < f2/f < -0.4 \quad (3\text{-}1)$$

where f2 is a focal length of the second lens component, and
f is a focal length of the whole eyepiece optical system, provided that when there is a variable diopter, each or the focal length is supposed to have a value at −1 diopter.

17. The eyepiece optical system according to claim 1, which satisfies the following Condition (4-1):

$$0.3 < f3/f < 0.9 \quad (4\text{-}1)$$

where f3 is a focal length of the third lens component, and
f is a focal length of the whole eyepiece optical system, provided that when there is a variable diopter, each or the focal length is supposed to have a value at −1 diopter.

18. The eyepiece optical system according to claim 1, which satisfies the following Condition (5-1):

$$0.68 < SF1 < 4.0 \quad (5\text{-}1)$$

where SF1 is a shape factor of the first lens component, as represented by $$SF1 = (r11 + r12)/(r11 - r12)$$

where r11 is a paraxial radius of curvature of a display-plane-side refractive surface of the first lens component, and
r12 is a paraxial radius of curvature of an exit-side refractive surface of the first lens component.

19. The eyepiece optical system according to claim 1, which satisfies the following Condition (6-1):

$$-3.5 < SF2 < -0.05 \quad (6\text{-}1)$$

where SF2 is a shape factor of the second lens component as represented by $$SF2 = (r21 + r22)/(r21 - r22)$$

where r21 is a paraxial radius of curvature of a display-plane-side refractive surface of the second lens component, and
r22 is a paraxial radius of curvature of an exit-side refractive surface of the second lens component.

20. The eyepiece optical system according to claim 1, which satisfies the following Condition (7-1):

$$-0.3 < SF3 < 0.26 \quad (7\text{-}1)$$

where SF3 is a shape factor of the third lens component as represented by $$SF3 = (r31 + r32)/(r31 - r32)$$

where r31 is a paraxial radius of curvature of a display-plane-side refractive surface of the third lens component, and
r32 is a paraxial radius of curvature of an exit-side refractive surface of the third lens component.

21. An electronic view finder, comprising:
an image display device having an image display plane for displaying an image, and
an eyepiece optical system as recited in claim 1.

22. The eyepiece optical system according to claim 1, wherein the reflective surface of the reflecting member deflects the optical axis about 90 degrees.

23. An eyepiece optical system, comprising in order from a display plane side, on which an image being viewed is formed, toward an exit side:
a first lens component of positive refracting power,
a reflecting member having only one reflective surface,
a second lens component of negative refracting power, and
a third lens component of positive refracting power,
wherein each of the lens components is a lens block that, in an optical path involved, contacts air at only two surfaces: a display-plane-side refractive surface and an exit-side refractive surface;
wherein a display-plane-side refractive surface of the second lens component is greater, in an absolute value of refracting power, than an exit-side refractive surface thereof.

* * * * *